United States Patent
Yokono et al.

(10) Patent No.: US 6,538,761 B1
(45) Date of Patent: Mar. 25, 2003

(54) COMPUTER SYSTEM

(75) Inventors: Shigeru Yokono, Kanagawa (JP); Seiichi Misawa, Kanagawa (JP); Satoshi Otsuka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/174,290

(22) Filed: Oct. 16, 1998

(30) Foreign Application Priority Data

Oct. 22, 1997 (JP) .............................................. 9-289555

(51) Int. Cl.⁷ .............................................. G03F 13/00
(52) U.S. Cl. ......................... 358/1.15; 358/1.1; 358/1.5
(58) Field of Search ........................ 358/1.1, 1.5, 1.11, 358/1.12, 1.13, 1.14, 1.15, 1.2, 1.16, 1.17, 1.18

(56) References Cited

U.S. PATENT DOCUMENTS

| | | | |
|---|---|---|---|
| 4,558,176 A | 12/1985 | Arnold et al. | 178/22.08 |
| 4,975,898 A | 12/1990 | Yoshida | 369/100 |
| 5,182,770 A | 1/1993 | Medveczky et al. | 380/4 |
| 5,295,126 A | 3/1994 | Okano et al. | 369/47 |
| 5,319,627 A | 6/1994 | Shinno et al. | 369/54 |
| 5,363,352 A | 11/1994 | Tobita et al. | 369/13 |
| 5,436,770 A | 7/1995 | Muto et al. | 360/51 |
| 5,461,220 A | 10/1995 | Ogino | 235/454 |
| 5,541,903 A | 7/1996 | Funahashi et al. | 369/54 |
| 5,592,452 A | 1/1997 | Yoshimoto et al. | 369/58 |
| 5,592,511 A | 1/1997 | Schoen et al. | 375/220 |
| 5,687,397 A | 11/1997 | Ohmori | 395/893 |
| 5,761,301 A | 6/1998 | Oshima et al. | 380/4 |
| 5,805,551 A | 9/1998 | Oshima et al. | 369/59 |

FOREIGN PATENT DOCUMENTS

| | | | |
|---|---|---|---|
| EP | 0 632 397 A2 | 1/1995 | G06F/17/60 |
| EP | 0 715 245 A1 | 6/1996 | G06F/1/00 |
| EP | 0 898 278 A2 | 2/1999 | G11B/27/031 |
| JP | 63-20769 | 1/1988 | G11B/20/12 |
| JP | 63-261578 | 10/1988 | G11B/20/12 |
| JP | 64-14776 | 1/1989 | G11B/20/12 |
| JP | 3-256225 | 11/1991 | G11B/7/00 |
| JP | 6-314174 | 11/1994 | G06F/3/06 |
| JP | 6-332762 | 12/1994 | G11B/12/00 |
| JP | 7-57263 | 3/1995 | G11B/7/00 |
| JP | 7-64841 | 3/1995 | G06F/12/00 |
| WO | 97/14118 | 4/1997 | G07F/7/00 |

OTHER PUBLICATIONS

U.S. patent application Ser. No. 08/750,223, filed Nov. 26, 1996.
U.S. patent application Ser. No. 09/330892, filed Jun. 11, 1999.
U.S. patent application Ser. No. 09/174769, filed Oct. 19, 1998.
U.S. patent application Ser. No. 09/318246, filed May 25, 1999.

*Primary Examiner*—Mark Wallerson
(74) *Attorney, Agent, or Firm*—Bell, Boyd & Lloyd LLC

(57) ABSTRACT

A computer system which can be freely used by many and unspecified persons. A recording medium is loaded in a computer terminal (public terminal), and use condition confirmation processing is performed by using information recorded on the medium. Use of the public terminal for various processes is allowed to be started according to a result of the use condition confirmation processing. Communication of information necessary for use condition confirmation processing with respect to use of the public terminal or for one of the various processes executed as use of the public terminal can be performed between the public terminal and a server system.

44 Claims, 24 Drawing Sheets

FIG. 2

| SYSTEM CONNECTION FORM | FUNCTION | | | FEE PAYMENT MODE | | |
|---|---|---|---|---|---|---|
| TYPE A: NETWORK CONNECTION | CAPABLE OF EDITING DATA FILE ON DISK | CAPABLE OF EACH OF UP-LOADING AND DOWN-LOADING TO MEDIUM IN PUBLIC TERMINAL | CAPABLE OF EACH OF UP-LOADING AND DOWN-LOADING IN NETWORK | | CAPABLE OF CREDIT CARD PAYMENT BASED ON PAYMENT REGISTRATION | CAPABLE OR INCAPABLE |
| TYPE B: NETWORK AND TELEPHONE LINE CONNECTION | | | INCAPABLE | USABLE WITHOUT CHARGE | HAVING FEE COLLECTION FUNCTION AND CAPABLE OF CURRENCY/PREPAID CARD PAYMENT | HAVING CARD ADAPTIVE FUNCTION AND CAPABLE OF CREDIT CARD PAYMENT |
| | | | HAVING TELEPHONE FUNCTION AND CAPABLE OF BEING USED AS PUBLIC TELEPHONE | | | |
| TYPE C: NON-NETWORK CONNECTION | | INCAPABLE | INCAPABLE | | INCAPABLE | INCAPABLE |

FIG. 9

| PUBLIC TERMINAL USE START TIME |
|---|
| PUBLIC TERMINAL NUMBER |
| NAME OF USED APPLICATION PROGRAM |
| USE START TIME |
| USE FINISH TIME |
| NAME OF DOWNLOADED APPLICATION |
| NAME OF EDITED FILE |
| NAME OF DOWNLOADED DATA |
| NAME OF DOWNLOADED CONTENT |
| ⋮ |
| PUBLIC TERMINAL USE FINISH TIME |

FIG. 10

| | |
|---|---|
| | PUBLIC TERMINAL NUMBER |
| | PUBLIC TERMINAL USE FEE, TIME |
| ○ | APPLICATION PROGRAM USE FEE, TIME |
| ○ | DOWNLOADED APPLICATION PROGRAM FEE |
| ○ | DOWNLOADED DATA FEE |
| ○ | DOWNLOADED CONTENT FEE |
| | ⋮ |
| | METHOD OF PAYMENT |

FIG. 13

|   | MEDIUM ID | USER ID | PASSWORD | CREDIT CARD NUMBER |
|---|---|---|---|---|
| #1 | 00824195-6301 | AB6151 | 1234 | 1234-5678-9012-3456 |
| #2 | 00005531-9910 | ZZZAQC | 5555 | 3296-1111-2222-3456 |
| #3 | 10101234-5678 | 346218 | 6239 | 0000-0101-3334-1121 |
| ------- | ------- | ------- | ------- | ------- |

COMPUTER SYSTEM

BACKGROUND OF THE INVENTION

1. Field of the Invention

The present invention relates to computer system and, more particularly, to a computer system which can be used by, for example, many and unspecified users according to their needs.

2. Description of the Related Art

Personal computers are now being used generally in an isolated state or in a state of being mutually connected in a network. Such computers are in the possession of individuals or organizations such as corporations or companies and each can be accessed or used only by a certain restricted number of persons.

To process or collect various sorts of information, it is necessary for an individual or a company to arrange a system by purchasing or renting a computer and connecting the computer to a network. It is not easy to form such a system for home personal use, in particular. Presently, under these circumstances, the majority of people cannot be said to be enjoying the benefits of the utilization of computers.

With the development of communication networks, a system for electronically providing information to many and unspecified persons is expected to be put to wide use soon or in future. It is desirable that a number of people, as large as possible, be able to use such service.

If such a system is formed as a fee-charging system, a need to consider security of payment arises as well as a need to enable many and unspecified users to pay easily for use.

In designing a computer unit usable by many and unspecified users, means for enabling a user or an information provider to check a record of use must be taken into consideration. That is, if such record data cannot be grasped, it is difficult for an individual or a system to perform, for example, use control, or fee management in the case of pay use.

SUMMARY OF THE INVENTION

In view of the above-described circumstances, an object of the present invention is to provide a computer system which can be used by, for example, many and unspecified users to collect and process information with a computer.

To achieve this object, according to one aspect of the present invention, there is provided a computer system having a computer terminal, a server system communicably connected to the computer terminal, and a recording medium detachably loaded in the computer terminal to be used for recording information and reproducing information, the computer terminal including use condition confirmation means for performing use condition confirmation processing using information recorded on the recording medium loaded, and control means for enabling use of each of various processes according to a result of the confirmation processing performed by the use condition confirmation means, the control means executing communication with the server system of information necessary for the use condition confirmation processing with respect to use of the computer terminal and one of the various processes executed as use of the computer terminal.

According to another aspect of the present invention, there is provided a computer apparatus having recording medium drive means capable of reading information from a detachable recording medium and writing information to the detachable recording medium, use condition confirmation means for performing use condition confirmation processing using information recorded on the recording medium when the recording medium is loaded to the drive means, and control means for enabling use of the computer apparatus according to a result of the confirmation processing, for forming record information according to processing executed in the computer apparatus, and for recording the record information on the loaded recording medium with the recording medium drive means.

According to still another object of the present invention, there is provided a computer apparatus having recording medium drive means for reading information from a detachable recording medium and for writing information to the detachable recording medium, use condition confirmation means for performing use condition confirmation processing using information recorded on the recording medium when the recording medium is loaded to the drive means, fee collection means for performing fee collection processing, and control means for enabling use of the computer apparatus according to a result of the confirmation processing performed by the use condition confirmation means, and for collecting a fee according to conditions of use of the computer apparatus with the fee collection means.

According to a further object of the present invention, there is provided a computer apparatus comprising recording medium drive means for reading information from a detachable recording medium and for writing information to the detachable recording medium, use condition confirmation means for performing use condition confirmation processing using information recorded on the recording medium when the recording medium is loaded to the drive means, fee collection means for performing fee collection processing, communication means for performing communication with an external server system, and control means for enabling use of the computer apparatus according to a result of the confirmation processing performed by the use condition confirmation means, and for collecting a fee according to conditions of use of the computer apparatus with the fee collection means.

BRIEF DESCRIPTION OF THE DRAWINGS

FIG. 2 is a diagram for explaining different types of public terminal in the computer system of the embodiment of the invention;

FIG. 9 is a diagram showing use record information recorded on the disk in the embodiment of the invention;

FIG. 10 is a diagram showing fee record information recorded on the disk in the embodiment of the invention;

FIG. 13 is a diagram showing registration information on the charging server side in the embodiment of the invention;

DESCRIPTION OF THE PREFERRED EMBODIMENT

A computer system which represents an embodiment of the present invention will be described in the order shown below.

A computer terminal in this embodiment will be referred to as "public terminal", and an example of a recording medium referred to below is a disk-like medium.

[I] System Configuration
[II] Network Computer System
II-1. Construction of Public Terminal
II-2. Disk
II-3. Use Procedure
II-4. Processing in Public Terminal
[III] Non-network Computer System
III-1. Construction of Public Terminal
III-2. Processing in Public terminal

[I] System Configuration

The configuration of a computer system which represents an embodiment of the present invention will be described below with reference to FIGS. 1 and 2.

Figure 1:
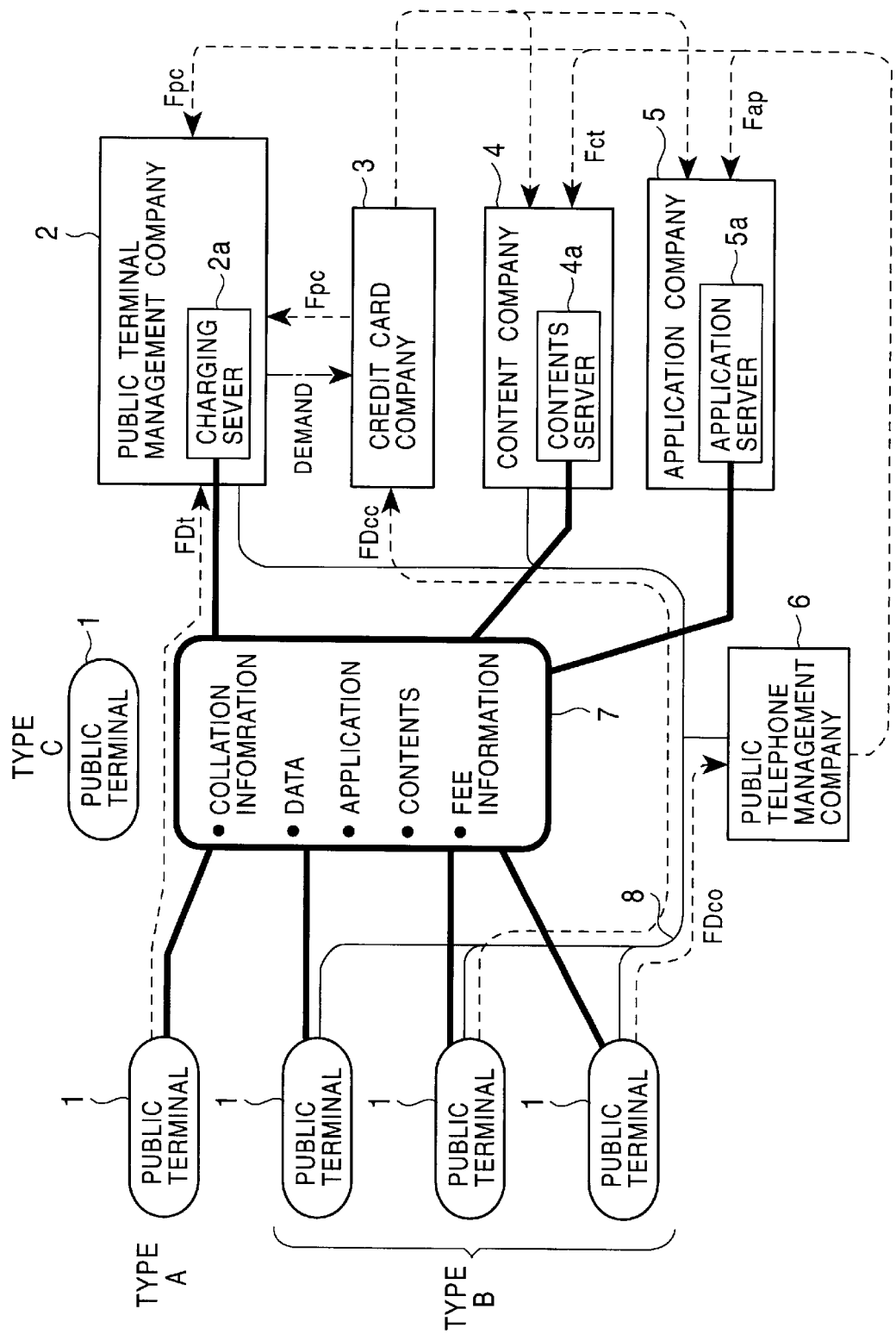
FIG. 1 is a diagram showing the network configuration of a computer system which represents an embodiment of the present invention.

FIG. 1 shows constituents of the system and an example of a fee collection method for a fee-charging system. FIG. 2 shows functions and fee payment methods with respect to types of public terminal.

As shown in FIG. 1, the computer system of this embodiment is formed between public terminals 1, a public terminal management company 2, a credit card company 3, a contents company 4, an application company 5, a public telephone management company 6, a network 7, and telephone lines 8.

That is, a plurality of public terminals 1 provided as computer terminals are connected by network 7 between a plurality of servers (charging server 2a in public terminal management company 2, contents server 4a in contents company 4, and application server 5a in application company 5). Some of the public terminals 1 are also connected by telephone lines 8 as well as by network 7. There are other public terminals 1 not connected to the network.

Types A, B, and C of public terminals 1 will be described with respect to their different connected forms.

Type-A public terminal 1 is a public terminal connected to network 7. The network 7 is a communication network formed as, for example, a local area network (LAN) for this computer system. The network 7 is controlled by the public terminal management company 2, for example.

Type-B public terminal 1 is a public terminal connected to network 7 and to telephone line 8. Telephone line 8 is, for example, a line in an ordinary public telephone network controlled by public telephone management company 6.

Type-C public terminal 1 is a public terminal which is not connected to the network 7, nor to telephone line 8, and which can function independently.

The construction and the operation of type-A and type-B public terminals 1 constituting a network computer system will be described in detail in the next section. The construction and operation of Type-C public terminal 1 constituting a non-network computer system will be described in detail subsequently.

Each type of public terminal 1 is set in a place such as to be usable by a certain number of unspecified persons, e.g., a store front or a building or ground of a railroad station, a school or a company.

A user can use public terminal 1 by loading his or her disk in the public terminal 1 with a fee charged for use or free of charge.

Thus, this system enables a user to edit a data file recorded on a disk and to upload or download a desired one of various sorts of data to between the disk and public terminal 1.

The public terminal management company 2 controls the public terminal 1 installed in each place, registers users, and performs collation processing for preventing unauthorized use with respect to registered users, fee collection management with respect to use by registered users, and so on. The charging server 2a is a section for performing these processings.

Between the public terminal management company 2 and each public terminal 1, uploading or downloading of various sorts of data, application software, contents of media (files or the like each corresponding to one information unit), etc. can be performed.

The credit card company 3 is a company which performs management of credit cards generally used. When a user registered with the above-described public terminal management company pays a charge by using a credit card, the credit card company 3 does, based on a demand from the public terminal management company 2, a service of receiving the amount of money corresponding to the charge drawn out from a user's bank account and paying it to organizations which are payees of the charged amount (public terminal management company 2, contents company 4, application company 5, etc.).

The contents company 4 provides, via the network 7, each public terminal 1 with electronic information for many and unspecified persons, e.g., electronic newspapers, electronic magazines, electronic books, music information (pieces of music or the like), video information (television programs and motion pictures). Each of these sorts of information is provided as one content of a medium to be stored in the contents server 4a. Each of contents stored in the contents server 4a is transmitted to the public terminal 1 according to a request from the public terminal 1 or is periodically transmitted to the public terminal 1 to update the corresponding information in the public terminal 1.

The application company 5 provides the computer system with application software. That is, the application company 5 provides, from its application server 5 and via the network 7, each public terminal 1 with application software usable in the public terminal 1. The application company 5 also provides an application program according to a request from the public terminal 1.

The public telephone management company 6 controls the public telephone network. If each type-B public terminal 1 has a telephone function, it can be used as a public telephone. The telephone management company 6 controls each type-B public terminal 1 when the type-B terminal is used as a public telephone.

Realizable functions and fee payment modes in the computer system 1 thus formed will be described with reference to FIG. 2 with respect to each type of public terminal 1.

Referring to FIG. 2, each public terminal 1 has, as its main functions, a function for editing a data file on a disk in the possession of a user, a function for uploading and downloading between a disk and public terminal 1, and a function for uploading and downloading between a disk and the network. Each public terminal 1 may also have an auxiliary function corresponding to the function of a public telephone.

The function for editing a data file on a disk referred to in the description of this embodiment corresponds to a process in which a user reads out to public terminal 1 a data file which the user has previously recorded on his or her disk, thereafter edits the file, and updates the file on the disk, and a process in which a user newly forms a data file with public terminal 1 and records the data file on his or her disk. Needless to say, it is not always necessary to writes data edited on public terminal 1 to a disk.

This function can be activated in public terminal 1 regardless of the state of connection in the network. That is, this function can be activated in each of type-A to type-C public terminals 1.

The function for uploading and downloading of data between a disk and public terminal 1 enables a user to upload some data file to a recording medium (e.g., a hard disk) in public terminal 1 and to download a data file, an application program, a content of a medium or the like recorded on a hard disk or the like to his or her disk.

This function can be activated regardless of the state of connection in the network. That is, this function can be activated in each of type-A to type-C public terminals 1.

The function for uploading and downloading of data between a disk and network 7 enables a user to perform uploading and downloading between a disk in his or her possession and a terminal connected to the network, e.g., another public terminal 1, charging server 2a of public terminal management company 2, contents server 4a of contents company 4, or application server 5a of application company 5.

For example, this function enables a user to provides to the network a data file such as an electronic mail or a medium content made by itself and to download a data file, an application software, a content of a medium or the like from a terminal connected to the network to his or her disk.

Needless to say type-A and/or type-B public terminals 1 is arranged to use this function since connection to the network is necessary for this function.

Public terminal 1 can function as a public telephone if it has a public telephone function and, of course, if it is connected to the public telephone network. Therefore, only type-B public terminal 1 can have the additional public telephone function.

Fee payment modes will now be described. Each of the different types of public terminal 1 can be provided to be used without charge by the general public (or a restricted number of persons in an organization). For example, public terminals may be provided in several places of a school and students to enable members in the stuff in the school to freely use the public terminals 1 to execute processing based on the above-described functions.

If use of public terminal 1 is charged for, a user may pay for it by registering for payment with the public terminal management company 2 such that the charged amount is automatically deducted from a user's credit card account, may pay in currency or with a prepaid card, or may pay by credit card loading.

With respect to credit card payment based on payment registration, the public terminal company 2 performs necessary management.

When a user purchases a disk, he or she takes the necessary registration procedure for using public terminal 1 with the disk and paying for use with a credit card.

After the public terminal management company 2 has accepted the registration, the user can use public terminal 1 by using the disk without current money or a prepaid card.

In this case, at the time of use of public terminal 1, the loaded disk and the user are strictly checked in each of the public terminal 1 and the charging server 2a. If the results of checking are OK, the user is allowed to use the public terminal 1.

In this checking, a disk serial number, a user identification code (ID) and a password or similar data are used. A method for this checking will be described below in detail.

When use of public terminal 1 is finished, information FDt for charging a fee is sent from the used public terminal 1 to the charging server 2a, as shown in FIG. 1, for example.

Based on management performed by the charging server 2a, the public terminal management company 2 presents the credit card company 3 with the user fees (a fee for use of the public terminal, a fee for use/purchase of a content, a fee for use/purchase of application software, etc.) and charges a fee Fpc for use of the public terminal. The credit card company 3 receives from a user's bank account the amount of money corresponding to the fee presented by the public terminal management company 2, and pays the fee Fpc for use of the public terminal to the public terminal management company 2.

If a content provided by the contents company 4 has been used or purchased by using the public terminal, the credit card company 3 pays the corresponding content use/purchase fee Fct to the contents company 4.

Further, if an application program provided by the application company 5 has been used or purchased by using the public terminal, the credit card company 3 pays the corresponding application purchase fee Fap to the application company 5.

This method of collecting fees from users is used on condition that each user having a credit card has a payment registration with the public terminal management company 2, and that public terminals 1 used are connected to the network 7. Therefore, the public terminals used in this case are limited to the type A or B.

The above-described payment method using a credit card will hereinafter be referred to as "registration payment" for convenience' sake.

Public terminal fee Fpc is a fee to be paid by a user according to, for example, the time period through which the user uses public terminal 1.

Content use/purchase fee Fct is a fee to be paid by a user for downloading (purchase) of a content to a user's disk or for use a content (e.g., reading of electronic newspaper) on public terminal 1.

Application purchase fee Fap is a fee to be paid by a user for downloading (purchase) of an application program to a user's disk or for use of an application program for processing on public terminal 1.

A method of payment in current money (coins or notes) or with a prepaid card will next be described. Each type of public terminal 1 may have a processing function adapted to use of coins or a prepaid card. If each type of public terminal 1 has such a function, this payment method is basically usable regardless of the types of public terminal.

However, only use of type-B public terminal 1 is possible in the case of using public terminal 1 as a public telephone with a processing function adapted to use of coins or a prepaid card to collect telephone charges. In such a case, when type-B public terminal 1 is used with coins or a prepaid card, it transmits information FDco for charging a fee to the public telephone management company 6 via telephone line 8, for example.

The public telephone management company 6 pays fee Fpc for use of the public terminal to the public terminal management company 2 based on the transmitted data of user fees (a fee for use of the public terminal, a content use/purchase fee, an application use/purchase fee, etc.)

If a content provided by the contents company 4 has been used or purchased by using the public terminal, the public telephone management company 6 pays the corresponding content use/purchase feet Fct to the contents company 4. If an application program provided by the application company 5 has been used or purchased by using the public terminal, the public telephone management company 6 pays the corresponding application use/purchase fee Fap to the contents company 4.

Another payment method, such as that recently introduced into the public telephone system, is possible in which, to use public terminal 1, a credit card is directly loaded in the public terminal 1. In such a case, it is necessary that the public terminal 1 has a processing function adapted to such use.of a credit card.

If public terminal 1 is used with such a payment method, it transmits information FDcc for charging a fee to the credit card company 3 via telephone line 8, for example.

Based on the transmitted data on user fees (a fee for use of the public terminal, a content use/purchase fee, an application use/purchase fee, etc.), the credit card company 3 receives from a user's bank account the amount of money corresponding to the charge, pays fee Fpc for use of the public terminal to the public terminal management company 2, pays content use/purchase fee Fct to the contents company 4, and pays application use/purchase fee Fap to the application company 5.

With respect to this method, type-B public terminal is exclusively used since connection to telephone line 8 is necessary. However, if the credit card company 3 is connected to the network 7, it is also possible to use type-A public terminal 1.

The above-described payment method of directly depositing or inserting current money, a prepaid card or a credit card in public terminal 1will hereinafter be referred to as "deposition payment" for convenience' sake.

The constituents of the computer system, the fee payment modes, and the functions of public terminals 1 have been described with reference to FIGS. 1 and 2. However, they are only an example of specific arrangements and operating functions of the system described below.

In particular, a wide variety of organizations constituting the computer system is conceivable (with respect to the number and the type of server systems) and, correspondingly, various network connections and fee collection systems may be formed.

[II] Network Computer System

II-1. Construction of Public terminal

A computer system connected in a network will now be described. In this computer system, public terminals 1 used are of the above-described type-A or B.

The following description is made chiefly of type-B public terminal 1. The type A is basically the same as the type B with respect to the construction and operation of public terminal 1 while it has no function corresponding to the public telephone function of the type B. Therefore, only differences of the type A from the type B will be described last as details of the type A.

Figure 3:
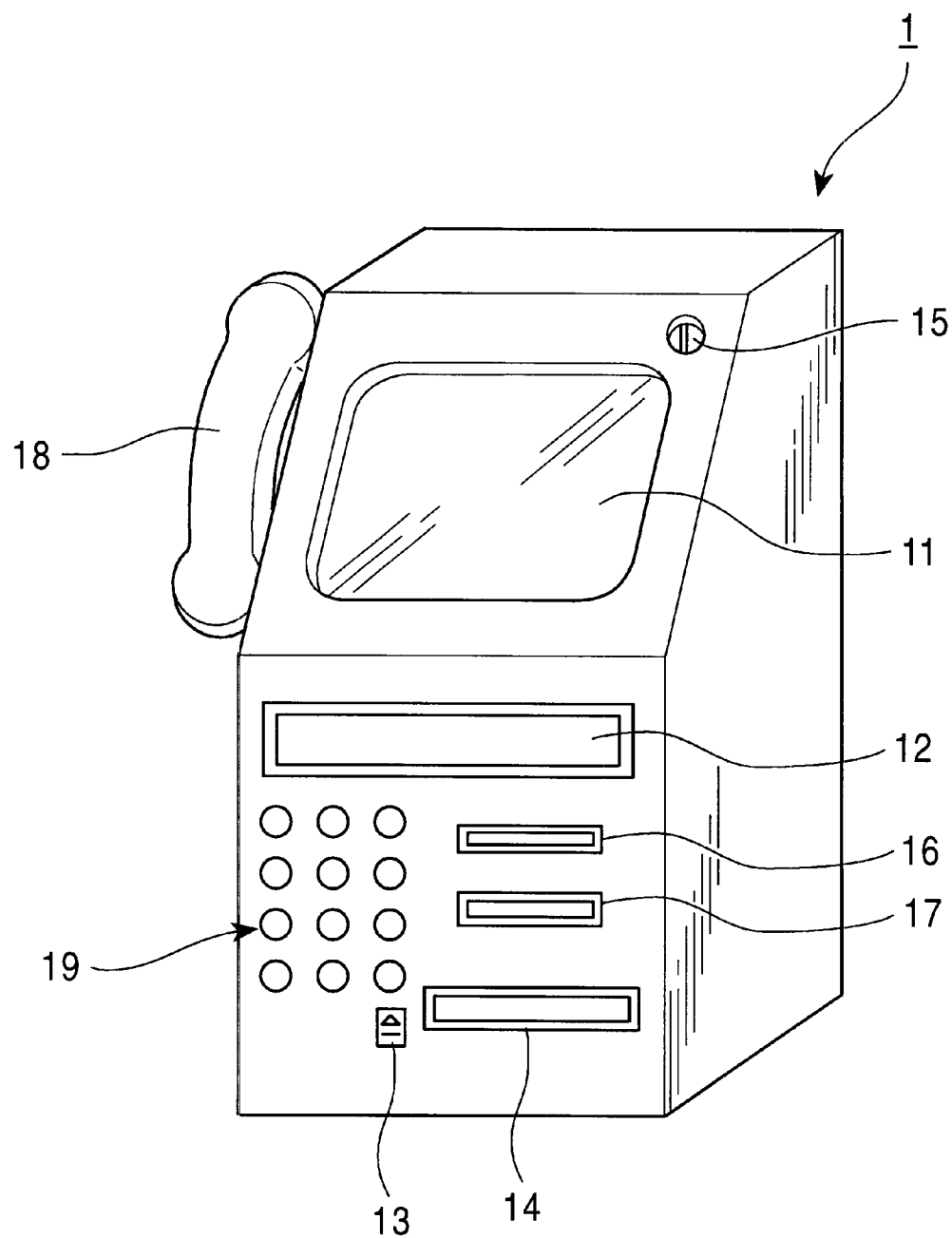
FIG. 3 is a diagram showing an external appearance of a public terminal connected to a network in the embodiment of the invention.
Figure 4:
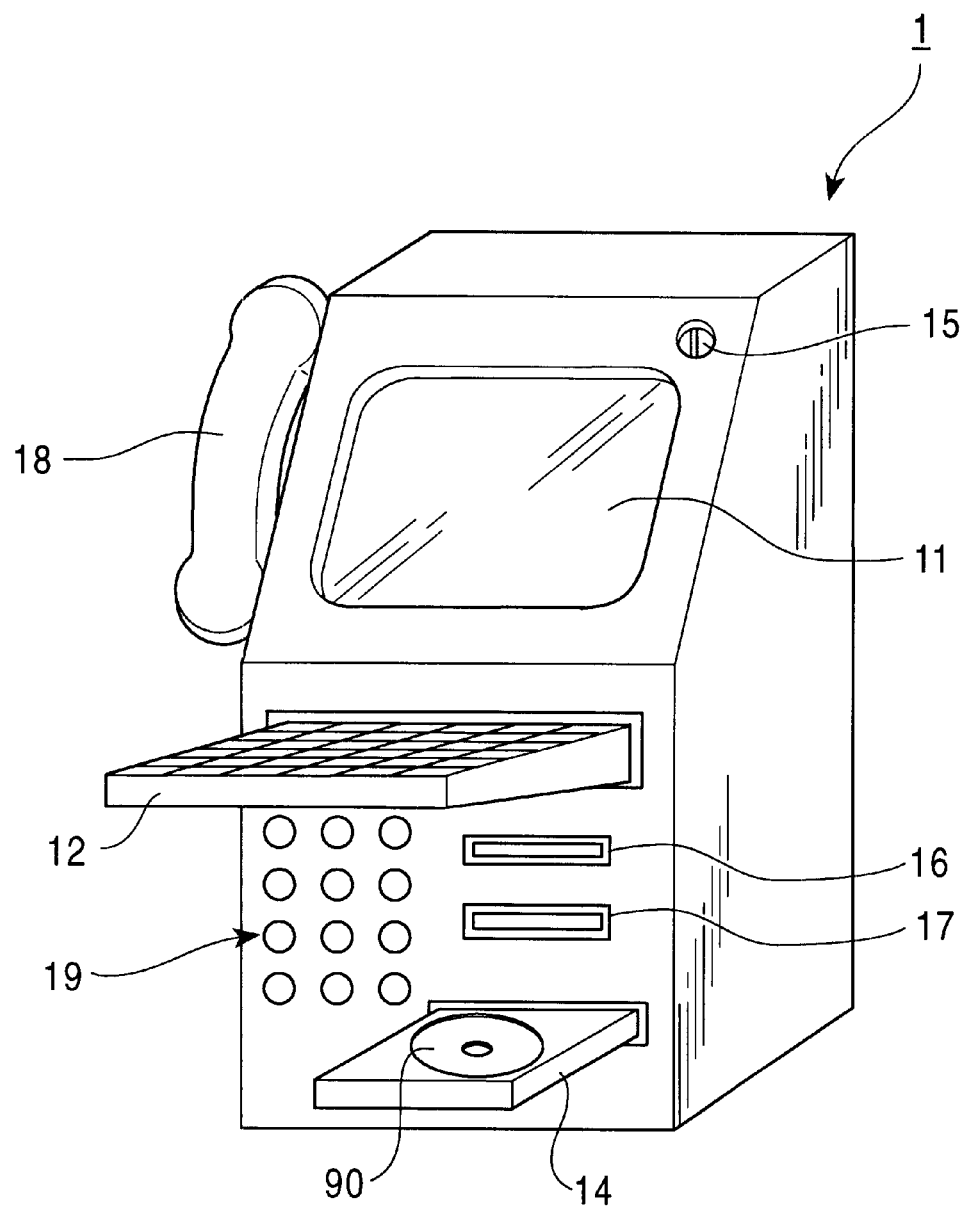
FIG. 4 is a diagram showing another external appearance of the public terminal connected to the network in the embodiment of the invention.

FIGS. 3 and 4 shows an external appearance of an example of type-B public terminal 1.

This public terminal 1 is placed in front of a store or in a like place if it is intended to for public use. For example, it resembles an ordinary public telephone in external appearance.

Referring to FIG. 3, a display 11 using a liquid crystal panel or a cathode ray tube (CRT) is formed in an upper front portion of public terminal 1. The display 11 has a screen for monitoring when public terminal 1 is used.

A keyboard 12 is provided as an input device to be operated by a user. As shown in FIG. 3, the keyboard 12 is set in an unusable state by being set in the body of public terminal 1 when not used. When the keyboard 12 is used, it is set in a usable state by being put out of the body of the terminal, as shown in FIG. 4. In this example, the keyboard 12 is automatically put out or retracted when use of public terminal 1 is started or finished, as described below. However, the arrangement may alternatively be such that a user manually draws out or pushes in the keyboard 12 at the time of starting or finishing using public terminal 1.

At the time of use of public terminal 1, it is necessary for a user to load a disk 90 in his or her possession. A disk tray 14 is provided as a component for loading the disk 90. The disk tray 14 is ejected out of the body of the terminal, as shown in FIG. 4, when the user presses an eject key 13. In this state, the user places the disk 90 on the disk tray 14 and again operates the eject key 13 to set the disk tray 14 in the body of the terminal, as shown in FIG. 3. The disk 90 is thereby loaded in an internal disk drive (disk drive 24 shown in FIG. 5). Thereafter, the public terminal 1 can perform recording or reproducing operation for recording data on the disk 90 or reproducing data from the disk 90.

This public terminal 1 is arranged to enable a user to select the above-described registration payment (payment based on credit card registration) or deposition payment (payment by depositing or inserting current money, a prepaid card, or a credit card) as user fee payment mode. To enable deposition payment, a coin slot 15, a prepaid card slot 16 and a credit card slot 17 are provided, as illustrated. This public terminal 1 is connected to the network 7 and telephone line 8 shown in FIG. 1. In particular, the public terminal 1 is connected to telephone line 8 to have a public telephone function such as to be also usable as a public telephone. Accordingly, a handset 18 and dial keys 19 are provided, as illustrated.

Figure 5:
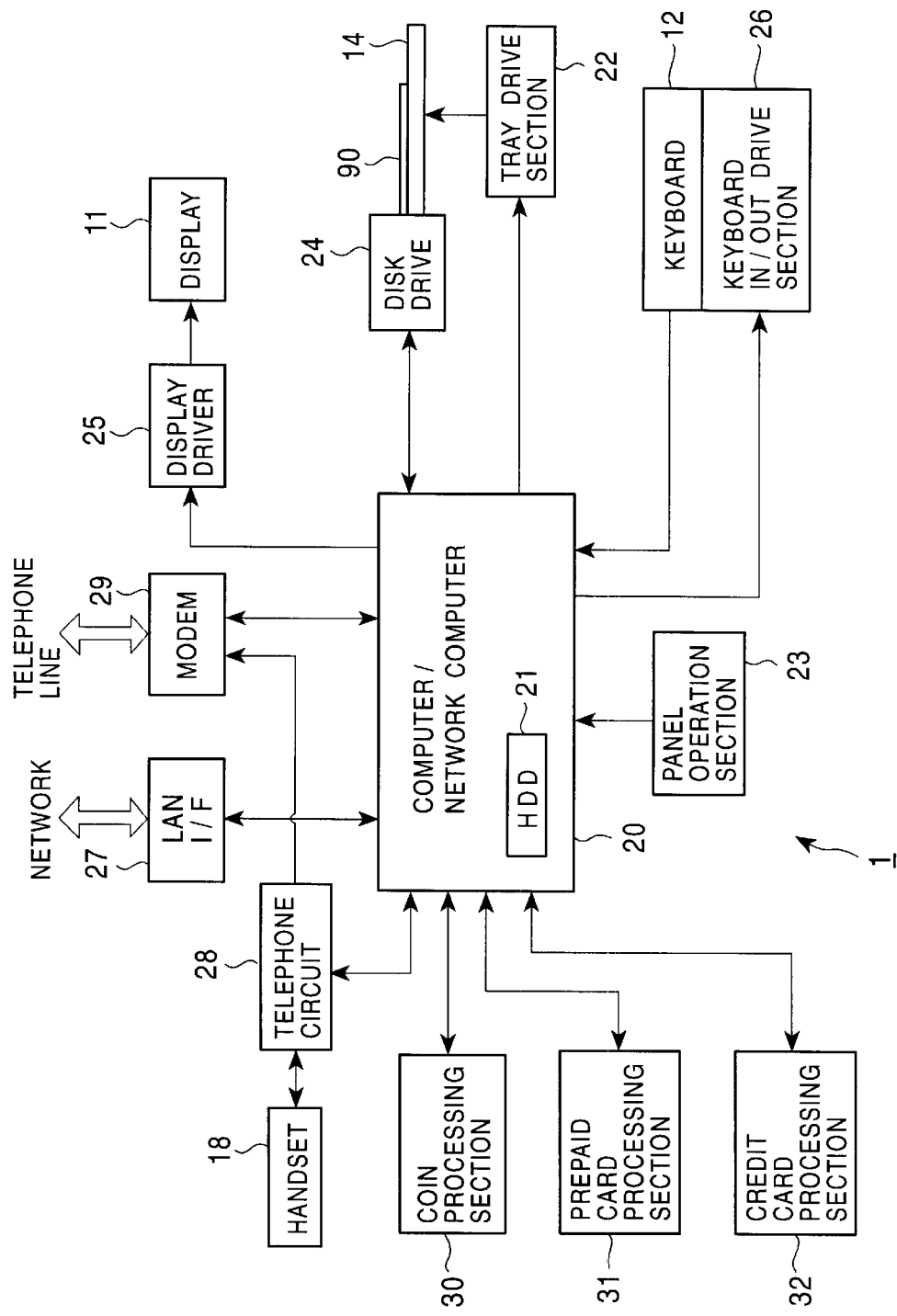
FIG. 5 is a block diagram of the public terminal connected to the network in the embodiment of the invention.

FIG. 5 shows the internal configuration of public terminal 1.

A computer and network computer section 20 (hereinafter referred to as computer 20) is a processing section for enabling public terminal 1 to performs various computer processings. The computer 20 includes a central processing unit (CPU) for performing calculation and control processing, a random access memory (RAM) section provided as a main memory, and a read only memory (ROM) section for storing an operating system and other programs, and has a function for interfacing with other components of public terminal 1, a function for interfacing with the network 7 and telephone line 8, etc.

The computer 20 also has a hard disk drive 21 provided as an internal storage medium.

As input devices for the computer 20, a panel operation section 23 and the above-mentioned keyboard 12 are provided.

In the panel operation section 23, eject key 13 and dial keys 19 are provided, as mentioned above.

The keyboard 12 is driven by a keyboard in/out drive section 26 to be put out or retracted. The computer 20 instructs the keyboard in/out drive section 26 to put out the keyboard 12 when a user uses the terminal. The keyboard in/out drive section 26 drives a keyboard moving motor (not shown) in accordance with this instruction. By the operation of this keyboard moving motor, keyboard moving gears (not shown) are driven, thereby moving the keyboard 12 to the usable position, as shown in FIG. 4.

When use of the public terminal 1 is finished, the computer 20 instructs the keyboard in/out drive section 26 to retract the keyboard 12. The keyboard in/out drive section 26 drives the keyboard moving motor in accordance with this instruction to retract the keyboard 12 by the operation of the keyboard moving gears, thereby setting the keyboard in the retracted position, as shown in FIG. 3.

The disk 90 is loaded by being placed on the disk tray 14 in the disk drive 24 in the above-described manner, and recording of data on the disk 90 or reproduction of data from the disk 90 is thereafter performed in the disk drive 24.

The computer 20 instructs a tray drive section 22 to eject or retract the disk tray 14 in response to pressing of the eject key 13. The tray drive section 22 drives a tray moving motor and tray moving gears (not shown) in accordance with this instruction, thereby ejecting or retracting the disk tray 14. In some event, e.g., when use of the public terminal 1 is finished, the computer 20 instructs the tray drive section 22 to eject or retract the disk tray 14 without recognizing the operation of the eject key 13.

The disk drive 24 performs recording or reproducing operation when required by the computer 20 to record data on the disk 90 loaded in the disk drive 24 or reproduce data from the disk 90.

That is, the computer 20 transmits a read command, a read position address and a data length or like data or commands to the disk drive 24, and the disk drive 24 performs reading operation in accordance with this instruction and sends read data to the computer 20. Also, the computer 20 transmits to the disk drive 24 a write command, a write position address and a data length or like data or commands, and file data or the like.which is to be written, and the disk drive 24 performs a writing operation in accordance with this instruction to record the transmitted data file on the disk 90.

The display 11 displays, in computer processing/operating monitoring windows, a graphic image for a graphic user interface (GUI), letters of sentences or images during word or image processing, and the like. The computer 20 supplies a display driver 25 with information which is to be displayed, and the display driver 25 makes a display of the information on the display 11.

The public terminal 1 in this example is connected to the network 7, and therefore has a local area network (LAN) interface 27 for connection to the network 7. Through the LAN interface 27, the computer 20 can perform data communication with each component connected to the network 7 as shown in FIG. 1.

The computer 20 is also connected to telephone line 8 by a modem 29 and is therefore capable of data communication via telephone line 8. Further, a telephone circuit section 28 and the handset 18 are provided to enable the public terminal 1 to be used as a public telephone.

When the handset 18 is unhooked, the computer 20 detects the off-hook state of the handset 18 through the telephone circuit section 28, and starts a public telephone control mode, and makes the telephone circuit section 28 make a call in accordance with an operation using dial keys 19.

After the call has been put through to the desired terminal, the computer 20 makes the telephone circuit section 28 execute the ordinary telephone communication operation, thus enabling the public terminal to function as a public telephone.

This public terminal 1 has a coin processing section 30 for the above-mentioned adaptation to the deposition payment system. The coin processing section 30 performs fee collection processing with respect to coins deposited through the coin slot 15.

A prepaid card processing section 31 performs fee collection processing with respect to a prepaid card inserted in the prepaid card slot 16. For example, the prepaid card processing section 31 performs processing for updating magnetic data on the prepaid card and punching the card or the like according to a collected fee.

When payment is done by deposition of coins or by using a prepaid card, the computer 20 transmits information about the payment to the public telephone management company 6 via telephone line 8.

The credit card processing section 32 reads information from a credit card inserted in the credit card slot 17, and supplies the information to the computer 20. In this case, the computer 20 transmits credit card information (card number) and fee information to the credit card company 3 via telephone line 8.

Type-B public terminal 1 is constructed as described above, for example. It is not always necessary for type-B public terminal 1 to have all the above-described components, and type-B public terminal 1 may have components other than those illustrated. For example, in the case of one of possible type-B public terminals 1 not adapted to the credit card payment system, there is no need for the credit card slot 17 and the credit card processing section 32. Needless to say, if the public telephone function is not added, the handset 18 and the telephone circuit section 28 are unnecessary.

As an example of an additional component, a printer section may be provided to output a print when public terminal 1 is used. Needless to say, a printing unit formed separately from public terminal 1 may be connected to public terminal 1.

A mouse may be provided as an input device along with the keyboard 14. The mouse may be an ordinary mouse operated on a desk top or the like or a so-called air mouse which is held in a user's hand to be operated by being spatially moved, and which is capable of inputting operational information corresponding to a two-dimensional or three-dimensional movement with, for example, an angular velocity sensor, an acceleration sensor or a gravity sensor.

The terminal may also be provided with a CD-ROM (compact disk read only memory) drive.

Further, the terminal may be provided with a power amplifier and a speaker to enable a user to listen to music or the like provided as a content of a music medium in the place where the public terminal 1 is installed.

The construction of type-A public terminal 1 is such that the functional sections for connection to telephone line 8 is removed from the above-described type-B public terminal. That is, type-A public terminal 1 is constructed without handset 18 and telephone circuit section 28. In some case, it is constructed without credit card slot 17 and credit card processing section 32.

If public terminals 1 are used free of charge regardless of whether the terminal is of type A or B, there is, of course, no need for coin slot 15, coin processing section 30, prepaid card slot 16, prepaid card processing section 31, credit card slot 17 and credit card processing section 32.

II-2 Disk

Disk 90 used in the computer system of this embodiment as a recording medium in the possession of a user will next be described.

Preferably, disk 90 used in the computer system of this embodiment is a disk on which data can be written and which has a read only area in which data cannot be written. Therefore, a RAM disk such as shown in FIG. 6A or a partial ROM disk such as shown in FIGS. 6B or 6C is used as disk 90.

Figure 6A:
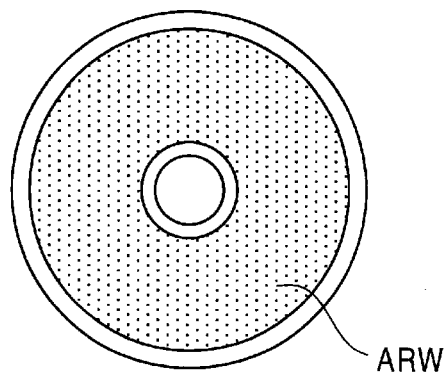
FIGS. 6A, 6B, and 6C are diagrams showing disks usable in the computer system of the embodiment of the invention.

The RAM disk shown in FIG. 6A has, for example, a magneto-optical region or a phase change region forming a rewritable area ARW for recording and reproduction corresponding to its entire main data area. In the case of this RAM disk, since the entire main data area is formed as a physically writable area, there is a need to set a non-rewritable data recording area in the entire data area. Such a non-rewritable area is formed by write-protecting some writable area with disk management information.

Figure 6B:
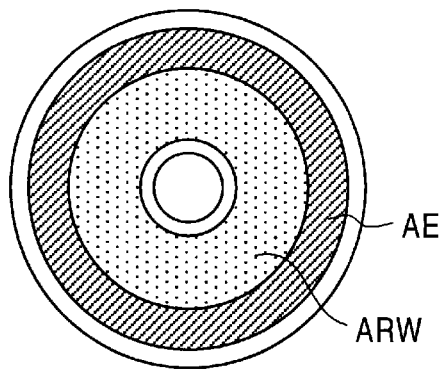
Figure 6C:
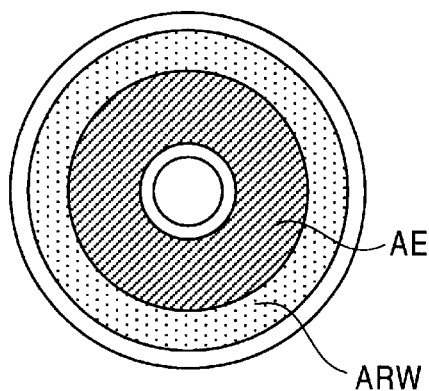

A partial ROM disk is, for example, a disk having the structure shown in FIGS. 6B or 6C. That is, a partial ROM disk has a ROM area AE and a rewritable area ARW defined in its main data area.

ROM area AE is an area where data is recorded by forming embossing pits or the like. That is, it is an area where it is impossible to rewrite data even in terms of physical rewritability. Such a partial ROM disk is most favorably used as a recording medium for the computer system of this embodiment, which should be a disk on which data can be written and which has a non-data-writable area.

Figure 7:
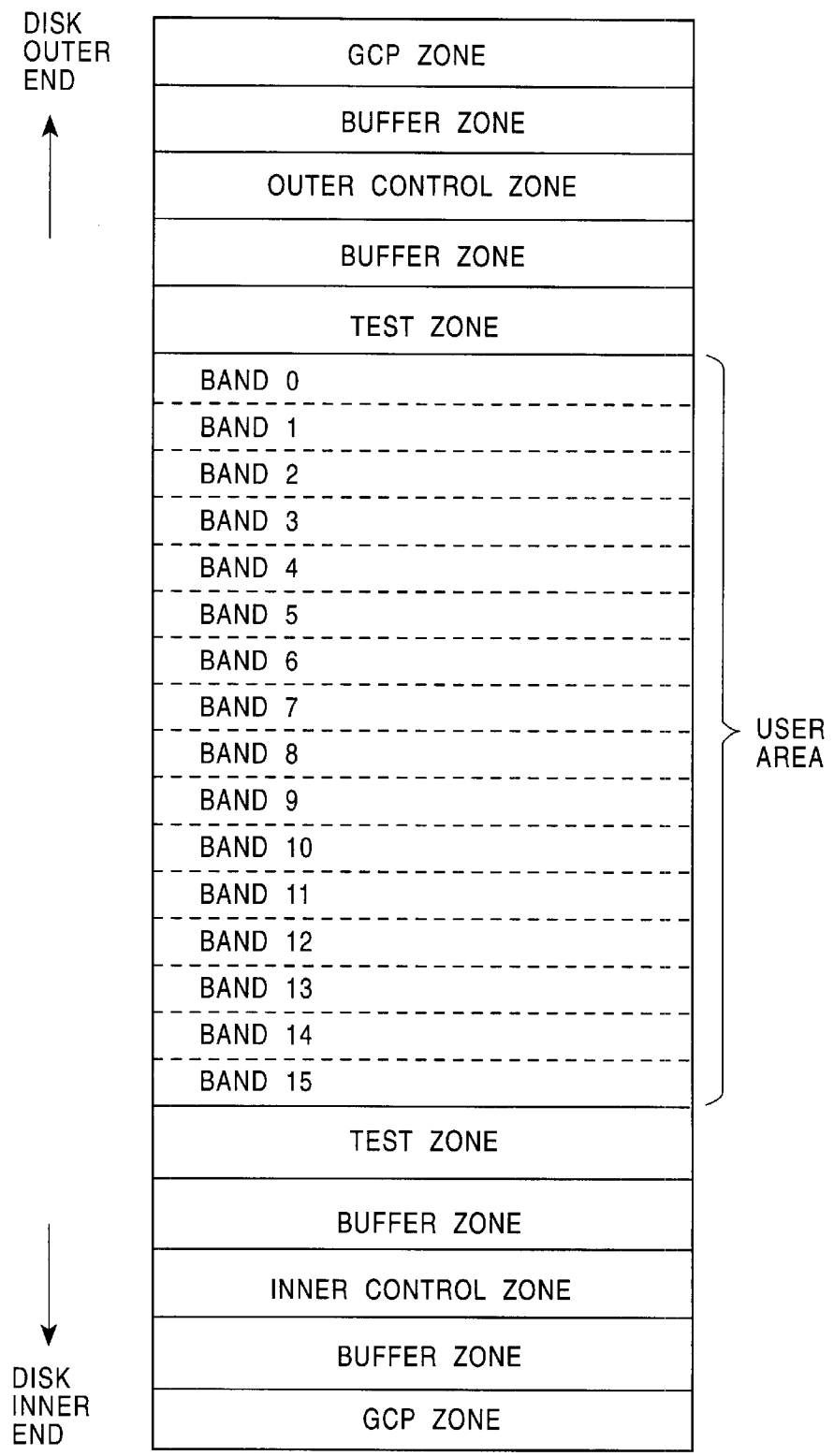
FIG. 7 is a diagram of area allocation on a disk in the embodiment of the invention.

FIG. 7 shows an example of area allocation from an outermost area to an innermost area common to the disks shown in FIGS. 6A to 6C as recording mediums used in this embodiment.

For example, a gray code part (GCP) zone is provided at the outer end of the disk, and a buffer zone, an outer control zone, another buffer zone and a test zone are successively formed toward the inner end.

Inside the test zone, a user area formed of a rewritable area ARW in which data can be recorded according to user's need and/or a ROM area AE for reproduction only is formed as a main data area. The user area is divided into sixteen bands 0 to 15.

In the RAM disk shown in FIG. 6A, the entire user area is formed as rewritable area ARW, and one band or a plurality of hands are treated as a read only area where writing is inhibited.

In the partial ROM disk shown in FIGS. 6B or 6C, some of the bands 0 to 15 form ROM area AE with embossing pits and the others form rewritable area ARW such as a magneto-optical area.

The number of bands forming rewritable area ARW in the sixteen bands and the number of bits forming ROM area AE can be set as desired on the manufacturer side.

In the examples of the disk shown in FIGS. 6B and 6C, rewritable area ARW and ROM area AE are formed separately from each other in inner and outer areas in the user area. However, each of rewritable area ARW and ROM area AE may be formed so as to be formed in such a manner that one or more of its bands are not adjacent to the others.

A test zone, a buffer zone, an inner control zone, another buffer zone and a GCP zone are provided inside the user area.

Each of the GCP zones, the outer control zone and the inner control zone formed outside and inside the user area is used as a management area in which predetermined control information is recorded.

On disk 90 formed as a partial ROM disk or a RAM disk as described above, information such as shown in FIG. 8 is recorded at the time of use of public terminal 1. An upper section of FIG. 8 corresponds to ROM area AE of a user area of a partial ROM disk (or a write-protected area of a RAM disk) while an lower section of FIG. 8 corresponds to rewritable area ARW of the user area. Information to be recorded in each of these areas is shown in the corresponding section.

While in this example the user area is formatted to record information, the management area, e.g., the above-mentioned control zone may be formatted to record the information shown in the illustration. Also, the format shown in FIG. 7 is only and example and it is not always necessary to format disk 90 as shown in FIG. 7.

In ROM area AE of disk 90 (or write-protected area), i.e., the area where recorded data cannot be rewritten by a user, a discrimination code is recorded, with which the medium is identified as one adapted to public terminal 1. Disk 90, if formed as a partial ROM disk, is manufactured with such a discrimination code recorded as embossing pits.

on the other hand, a medium ID is recorded in rewritable area ARW of disk 90.

The medium ID is a code corresponding to a disk serial number. That is, immediately before disks 90 are shipped, disks 90 are serially numbered. Each disk 80 has one code number different from others.

The medium ID is not only written on disk 90 but also attached as a code number to, for example, a package for disk 90 to enable a user to know the medium ID number after purchasing the disk.

In rewritable area ARW, an area for recording a user ID is prepared. A user freely sets a sequence of numerals or letters as a user ID and records this user ID in the user ID area. This user ID is a personal identification number for enabling the user to use public terminal 1 with the disk 90 on which the user ID is recorded. That is, only the user who knows the personal identification number can use the disk 90.

Recording of a user ID on disk 90 can be executed by a user using public terminal 1 as described below. Alternatively, for example, a user may record a user ID through a personal computer in his or her possession.

In rewritable area ARW, an area for recording a payment registration information is also prepared. In this area, information is recorded that credit card payment registration for enabling a user to perform registration payment has been made in the public terminal management company 2, and that the user can perform registration payment with respect to use of the disk having this information. This payment registration information can be recorded from public terminal 1 or a personal computer in the possession of the user, for example.

For example, the following process may be performed. A user has his or her credit card registered by a procedure described below, and the public terminal management company 2 thereafter sends a registration number to the user. The user loads disk 90 in public terminal 1 and inputs the registration number to the terminal. Then, collation processing is performed between the public terminal 1 and the public terminal management company 2. If the result of the collation processing is OK, information that registration payment can be performed with respect to the disk is recorded on the disk.

Further, in rewritable area ARW, use record information and fee record information are recorded.

Use record information is information about details of use of public terminal 1 recorded each time public terminal 1 is used with disk 90. Each time use of public terminal 1 is finished, the contents of use record information are updated (a new use record is added) by public terminal 1.

For example, use record information such as shown in FIG. 9 may be recorded. FIG. 9 shows an example of information added each time public terminal 1 is used.

First, a time when use of public terminal 1 is started (month, day, year, hours, minutes, seconds) is recorded. For recognition of the public terminal 1 used, a public terminal number set in the public terminal 1 is written.

A time when use of the public terminal is finished (month, day, year, hours, minutes, seconds) is also recorded.

Information such as that indicated by "○" on the left-hand side of FIG. 9 is recorded as a detail of actual use of public terminal 1.

For example, when a user edits a file or perform other operations by using public terminal 1, the user starts an application program stored in his or her disk or an application program obtained from a hard disk drive 21 of the public terminal 1 or from the network 7. A name of the application program thus obtained and used is recorded. Also, the use start time and the use finish time defining the time period through which the application program is used are also recorded.

The source or medium (not shown) from which the application program is obtained may also be recorded. That is, information as to whether the application program is one installed in hard disk drive 21 or downloaded from the application company or the like via the network 7 is recorded.

When the user downloads to disk 90 in his or her possession an application program stored in hard disk drive 21 of public terminal 1 or downloaded from the application company or the like via the network, a name of the downloaded data is recorded. Needless to say, the source of the application program may also be recorded.

When the user performs editing (i.e., updating of a file or newly forming a file) by using public terminal 1, a name of the edited file is recorded.

When the user downloads to disk 90 in his or her possession a data file stored in hard disk drive 21 of public terminal 1 or downloaded via the network, a name of the downloaded data is recorded. Needless to say, the source of the data may also be recorded. A data file, distinguished particularly from contents in this description, is, for example, a data file received as an electronic mail.

When the user downloads to disk 90 in his or her possession a content of a medium stored in hard disk drive 21 of public terminal 1 or a content downloaded from the contents company or the like via the network, a name of the downloaded content is recorded. Needless to say, the source of the content may also be recorded.

Each of the contents of processings performed in public terminal 1 used by a user in the above-described manner is recorded in use record information. Needless to say, kinds of contents recordable are not limited to those shown in FIG. 9. Other processing contents may be recorded if possible. For example, in a case where data provided as a content of a medium is only read from the display 11 of public terminal 1, this operation is recognized as use of the content, and a name of the used content, the use start time and the use finish time are recorded.

Information about a plurality of contents of the same kind may be recorded. For example, if a plurality of application programs are downloaded to disk 90, each of names of the application programs is recorded.

Fee record information is information about a fee to be paid each time public terminal 1 is used with disk 90. Each time use of public terminal 1 is finished, the contents of fee record information are updated (a new fee record is added) by public terminal 1.

For example, fee record information such as shown in FIG. 10 may be recorded. FIG. 10 shows an example of information added each time public terminal 1 is used.

First, for recognition of public terminal 1 used, a public terminal number set in the public terminal 1 is written.

As a fee paid for use of public terminal 1, a public terminal use fee is recorded. If use of public terminal 1 is charged for with respect to the time period through which the terminal is used, the use time period is recorded along with the use fee.

A payment method selected by a user at the time of use of the terminal is also recorded. That is, information which denotes registration payment or deposition payment is recorded. In the case of deposition payment, information which denotes payment in coin or with a prepaid card or a credit card is also recorded.

Further, as details of charging according to actual use of the public terminal, information such as that indicated by "○" on the left-hand side of FIG. 10 is recorded.

For example, if the user starts an application program stored in his or her disk when the user performs file editing or the like by the using public terminal 1, use of the application program is, of course, free of charge since the application program is in the possession of the user.

However, if the user starts an application program obtained from the hard disk drive 21 in the public terminal 1 or from the network 7, the user is charged an application use fee (needlessly to say, some application program may be provided without charge from the hard disk drive 21 or network 7). An application use fee charged in such a case is recorded. If the charging method is such that an application use fee is charged according to the use time period, the use time period is also recorded along with the use fee.

If data or a content of a medium for pay use is used, a content use fee or data use fee (not shown) is recorded.

Downloading by a user of an application program, data, a content of a medium or the like to disk 90 in the possession of the user is regarded as purchase of software.

Accordingly, if a user downloads an application program, data, a content of a medium or the like, and if the application program, data, or content is provided for pay, a download fee (purchase fee) is recorded.

The source (not shown) of the used or downloaded application program, data or content may also be recorded along with the use or download fee.

Details of charging, such as those described above, when a user uses public terminal 1 and executes downloading, are recorded in fee record information. Needless to say, information items designating a plurality of record contents of the same category may be recorded. For example, if a plurality of application programs are downloaded to disk 90, each of names of the application programs is recorded.

Figure 8:
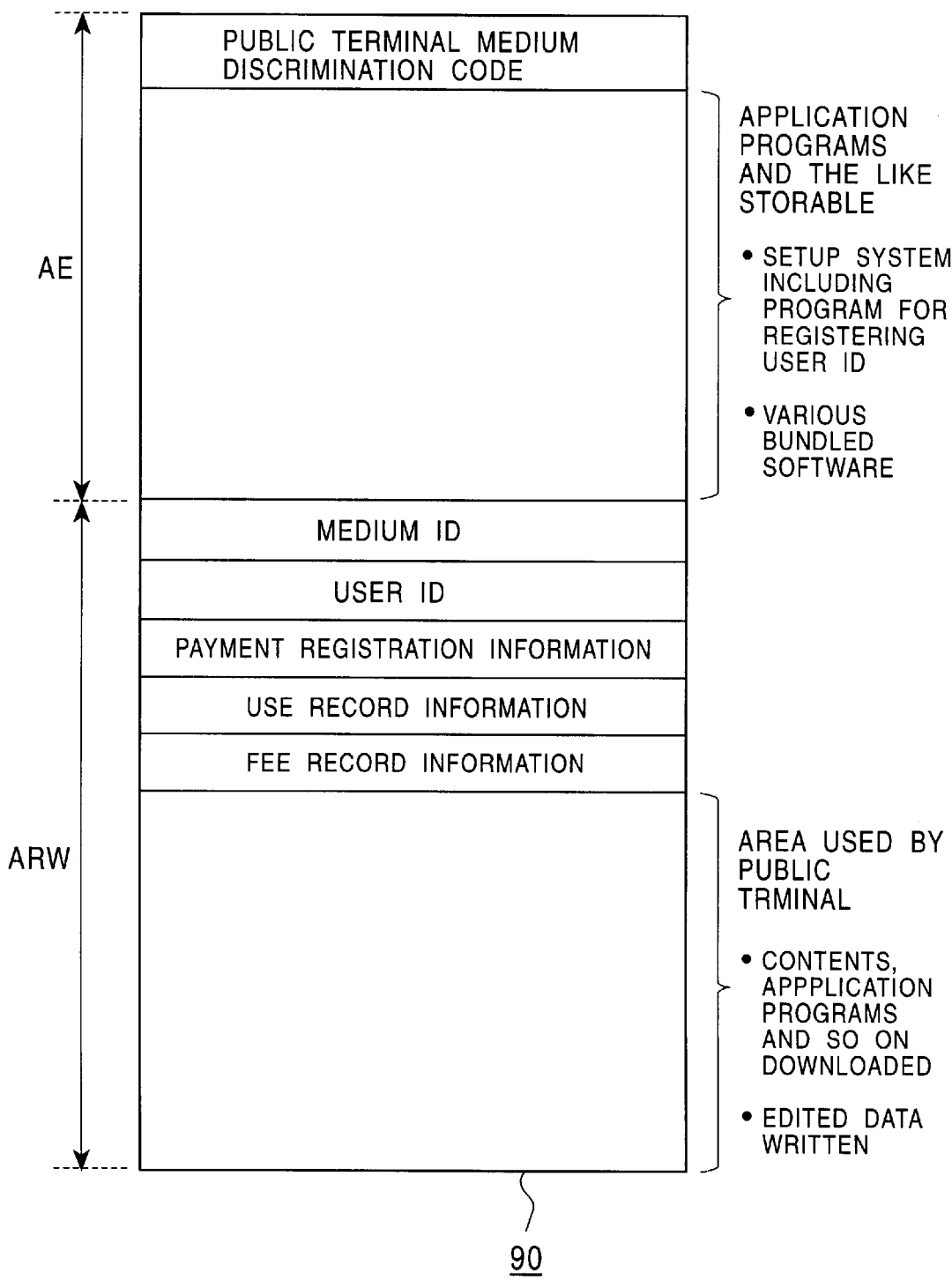
FIG. 8 is a diagram showing information recorded on the disk in the embodiment of the invention.

Rewritable area ARW shown in FIG. 8 is prepared to enable recording of at least a medium ID, a user ID, payment registration information, use record information and fee record information, as described above.

Of these sorts of information recorded in rewritable area ARW, the group of information other than payment registration information needs to be protected from being freely rewritten by a user.

A medium ID is maintained under write protection to be prevented from being rewritten.: Preferably, a user ID is prevented from being rewritten after being written. Only public terminal 1 can update use record information and fee record information. In some case, it is preferable to prevent rewriting of payment registration information after writing it.

Management of these sorts of information may be realized in such a manner that all or part of a medium ID, a user ID, payment registration information, user record information and fee record information are checked and held as files normally inaccessible (files concealed from a user) according to the forms of the files on disk 90 under management and a program for disk management provided in the public terminal 1.

To improve security of disk 90 itself, i.e., to eliminate a possibility of unauthorized use of disk 90, all or part of a medium ID, a user ID, payment registration information, use record information and fee record information are recorded after being enciphered.

While a user ID has been described as a personal identification number for use of public terminal 1, a password is set as another personal identification number if registration payment based on credit card registration is performed. The password, described below in detail, is not recorded on disk 90.

Information to be recorded in ROM area AE (or write-protected area) and rewritable area ARW of disk 90 is set as described above. The part of rewritable area ARW other than the part in which this information is recorded is used by public terminal 1.

That is, the remaining area is used as an area for storing a content of a medium, data, an application program or the like downloaded from public terminal 1.

ROM area AE may be limited to the area for a discrimination code. However, ROM area AE other than that for a discrimination code may be to record a setup system or the like.

For example, in using a partial ROM disk or a RAM disk as disk 90, there is a need to execute formatting on the user side to perform defect area management and to form file management information. In such a case, however, if a formatting program (setup system) for executing such formatting is recorded on the disk 90, the disk 90 can be formatted even if public terminal 1 or a personal computer in the possession of a user has no suitable formatting program.

A user ID, which a user is required to input, can be written, for example, in a personal computer in the possession of the user as well as in public terminal 1 if a program for writing the user ID is previously recorded.

As a free offering to a purchaser of disk 90, application programs may also be recorded in the form of bundled software for the convenience of users.

A disk has been described as an example of the recording medium of this embodiment. However, a different kind of writable recording medium, e.g., an IC card can be used instead of the disk.

II-3 Use Procedure

The procedure of use of public terminal 1 executed by a user with the above-described disk 90 will now be described.

Figure 11:
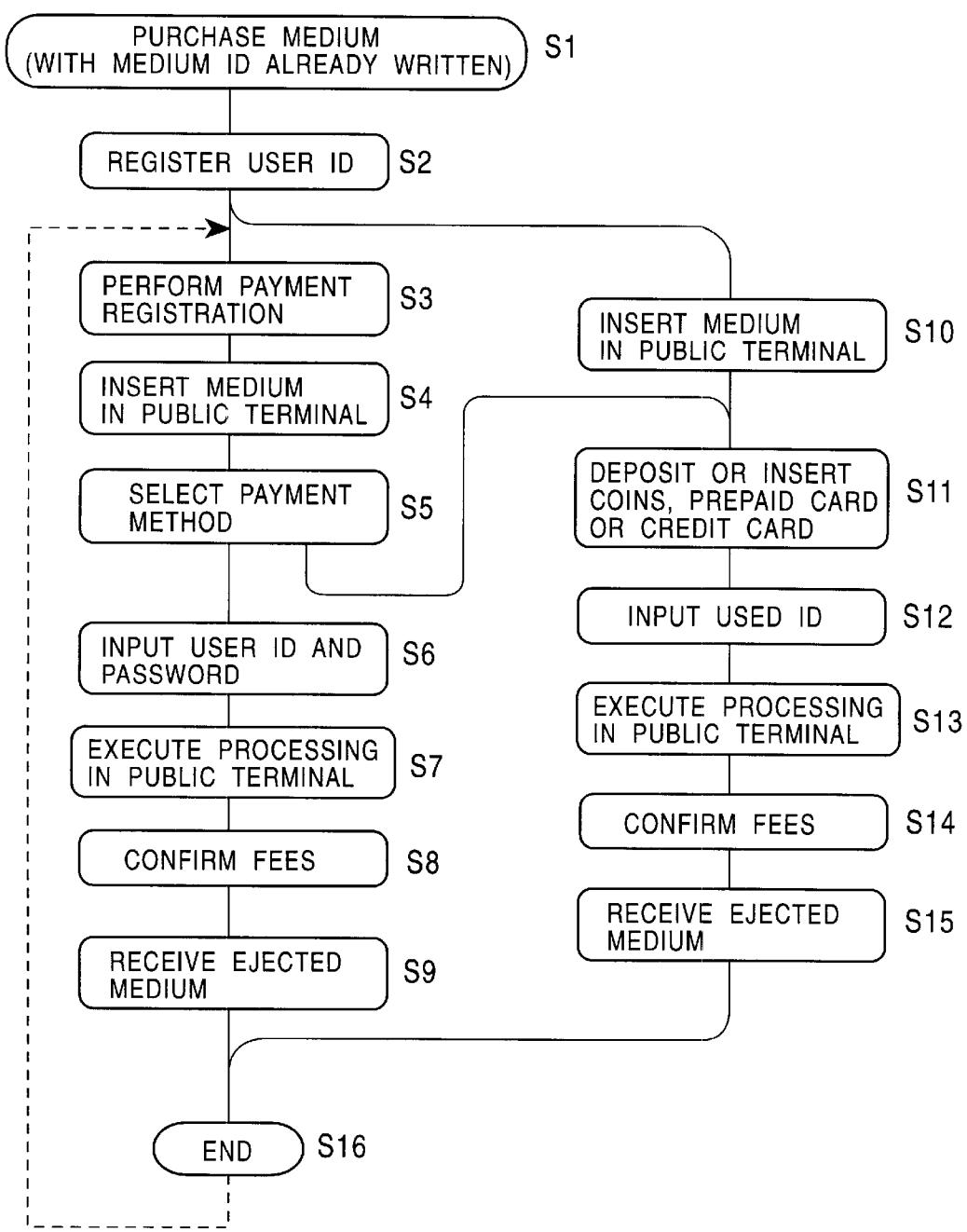
FIG. 11 is a diagram for explaining the procedure in which a user uses the computer system of the embodiment of the invention.

FIG. 11 shows steps of use by a user. In step S1, a user is required to obtain disk 90.

Disk 90 obtained by the user has a medium ID (disk serial number) written thereon, as described above.

The user can know the medium ID from a label or the like attached to the package of the disk.

After obtaining disk 90, the user writes a user ID on disk 90 in step S2 before actually performing downloading.

For example, after loading disk 90 in certain public terminal 1, the user inputs a user ID in the form of a sequence of numerical or other characters that the user has freely selected. The public terminal 1 records, as a user ID, the input sequence of numerical or other characters in the predetermined area of disk 90.

After recording of the user ID has been completed, use of public terminal 1 with registration payment from step S10 can be started.

However, if the user wishes to perform registration payment based on card registration with respect to payment of a fee for use of the public terminal and other fees, the user is required to complete payment registration in step S3.

Figure 12:
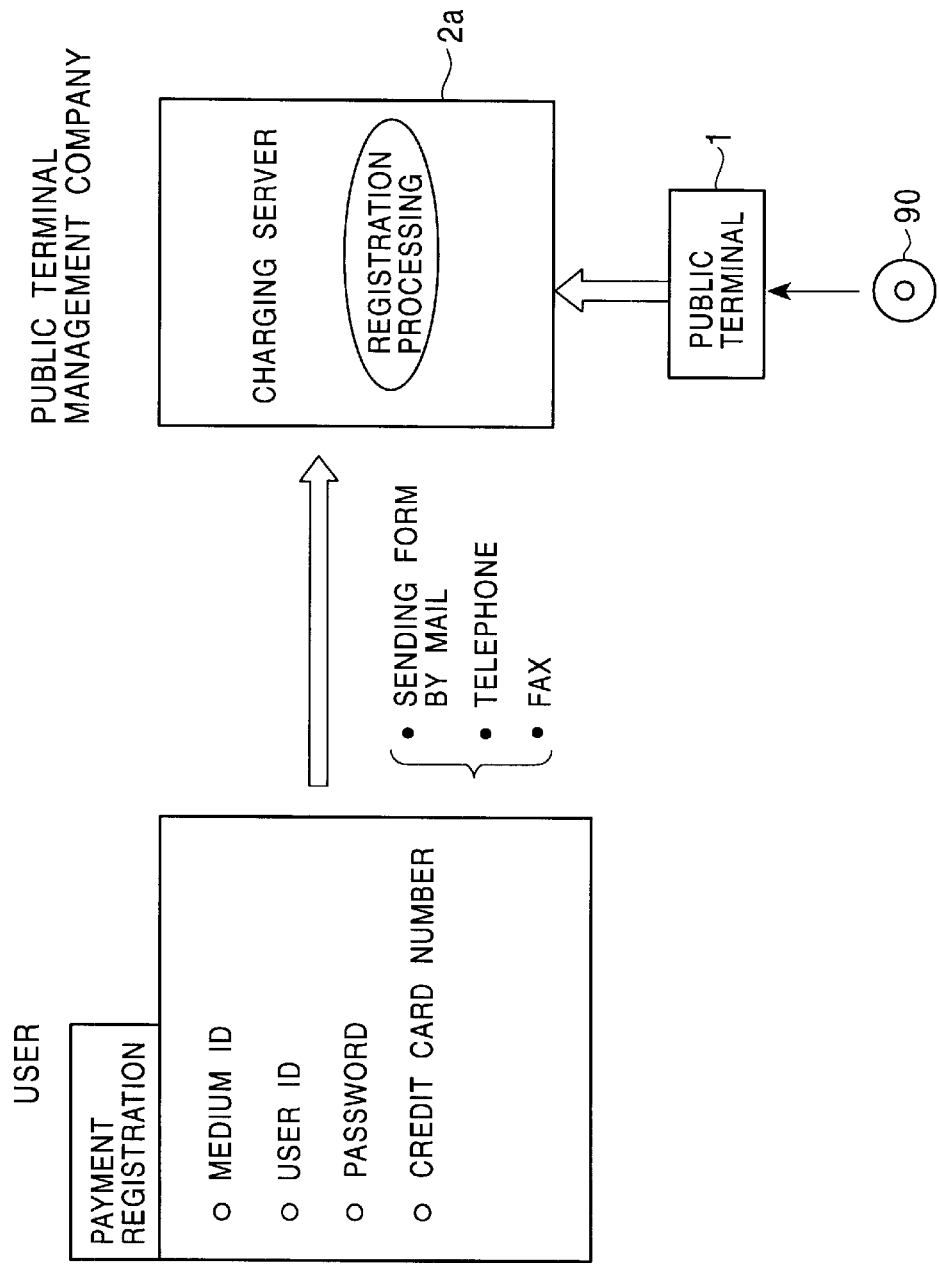
FIG. 12 is a diagram for explaining a credit card registration procedure in the embodiment of the invention.

Payment registration made in step S3 will be described with reference to FIGS. 12 and 13.

The user enters the medium ID, the user ID, a password and a credit card number on a certain medium, e.g., a registration form which the user has received as an appendix at the time of purchasing the disk. The user enters the medium ID by reading it from the label attached to the package for the disk 90. The medium ID may be previously entered in the registration form. The user ID entered is a code which A is set in step S2. The password is a personal identification number for registration payment, which is set by the user at the time of this registration.

After entry of these information items, the user sends the registration form to the public terminal management company 2 by mail. Alternatively, the user may inform the public terminal management company 2 of these information items by telephone or by using a facsimile machine.

In the public terminal management company 2, the charging server 2a performs registration processing based on the contents of information sent by mail or telephone.

For example, in the charging server 2a, a medium ID, a user ID, a password and a credit card number are registered with a registration number indicated by #n in FIG. 13 as registration contents with respect to each of a number of users.

After execution of such registration, information that registration payment is allowed with respect to the disk 90 is recorded as payment registration information on the disk 90.

This payment registration information may be recorded as described below. When the registration number sent from the public terminal management company 2 is input after loading the disk 90 in the public terminal 1 as described above, processing for collation of the medium ID and so on is performed between the public terminal 1 and the public terminal management company 2 (e.g., collation between the medium ID recorded on disk 90 and the medium ID registered as shown in FIG. 13). If the result of collation is OK, information that registration payment is allowed with respect to the disk 90 is recorded.

Alternatively, the user may instruct, for example, public terminal 1 to record, without such particular collation, information that registration payment is allowed with respect to the disk 90.

If the user wishes to purchase another disk 90 and to perform registration payment with respect to this disk 90 by using the same user ID and password, the user can register this payment by using public terminal 1 as well as by mailing the form, by telephone or by using a facsimile machine. Preferably, in such a case, the user only input, as user ID and password, the same numbers as those in the former registration without transmitting the credit card number (not input by the user) via the network. Since public terminal 1 may only read the medium ID on the disk 90 in such a case, it is not necessary for the user to input the medium ID.

After completing payment registration in step S3, the user can use public terminal 1 from step S4.

That is, in step S4, the user brings the disk 90 to the place where public terminal I is installed and loads the disk 90 in the public terminal 1.

At this time, the user can select registration payment or deposition payment as a fee payment method.

If registration payment is selected in step S5, the user inputs, in step S6, two personal identification numbers, i.e., the user ID and password at a request from the public terminal 1.

From this input, collation processing described below in detail is started with respect to the input user ID and password, the medium ID and user ID which are information recorded on the loaded disk 90, and the medium ID, user ID and password registered on the charging server 2a side. A determination is made on the charging server 2a side as to whether the conditions for use: are satisfied.

If the result of this collation processing performed as use condition confirmation is OK, the user can execute downloading to the disk 90 by using the public terminal 1 in step S7.

When the user gives the public terminal 1 a command to finish processing, the public terminal 1 presents a fee as a result of use of the public terminal 1. The user confirms the fee in step S8. The user takes the disk 90 unloaded from the disk tray 14 in step S9 to finish the process of using the public terminal 1 one time (step S16).

On the other hand, even if the user has not registered for payment, he or she can use the terminal by performing step S10 and other subsequent steps after completing step S2.

That is, in step S10, the user brings the disk 90 to the place where public terminal 1 is installed and loads the disk 90 in the public terminal 1.

Since information that registration payment is not allowed with respect to the disk 90 is not recorded as payment information on the disk 90, the public terminal 1 requests the user to deposit or insert coins, a prepaid card or a credit card for deposition payment processing. In step S11, the user deposits or inserts coins, a prepaid card or a credit card.

If deposition payment is selected in step S5, the process also moves to step S11.

Thereafter, at a request from the public terminal 1, the user inputs the user ID, i.e., the personal identification number, in step S12. Since the password is a personal identification number for registration payment, the password is unnecessary in this case.

From this user ID input, processing for collation between the input user ID and the user ID information recorded on the loaded disk 90 is started and a determination is made on the public terminal 1 side as to whether the condition for use is satisfied.

If the result of this collation processing performed as use condition confirmation is OK, the user can execute downloading to the disk 90 by using the public terminal 1 in step S13.

When the user gives the public terminal 1 a command to finish processing, the public terminal 1 presents a fee as a result of use of the public terminal 1. The user confirms the fee in step S14. The user takes the disk 90 unloaded from the disk tray 14 in step S15 to finish the process of using the public terminal 1 one time (step S16).

A user can use public terminal 1 by using purchased disk 90 based on the above-described process, for example.

II-4 Processing in Public Terminal

Processing executed by the computer 20 of public terminal 1 (and by the network) to realize use of public terminal 1 based on the above-described process and to execute various kinds of processing according to user's need will next be described with reference to FIGS. 14 to 19.

Public terminal 1 is set in a standby state such as shown in FIG. 3 in an installation place. When a user loads disk 90 in the public terminal 1, processing shown in FIGS. 14 to 18 is started.

To load the disk 90, the user ejects the disk tray 14 by operating the eject key 13. When the user again presses the eject key 13 (or pushes the disk tray 14) after placing the disk 90 on the disk tray 14, the computer 20 causes the disk tray 14 to retract, thereby enabling recording on the disk 90 or reproduction from the disk 90 to be performed with the disk drive 24.

Figure 14:
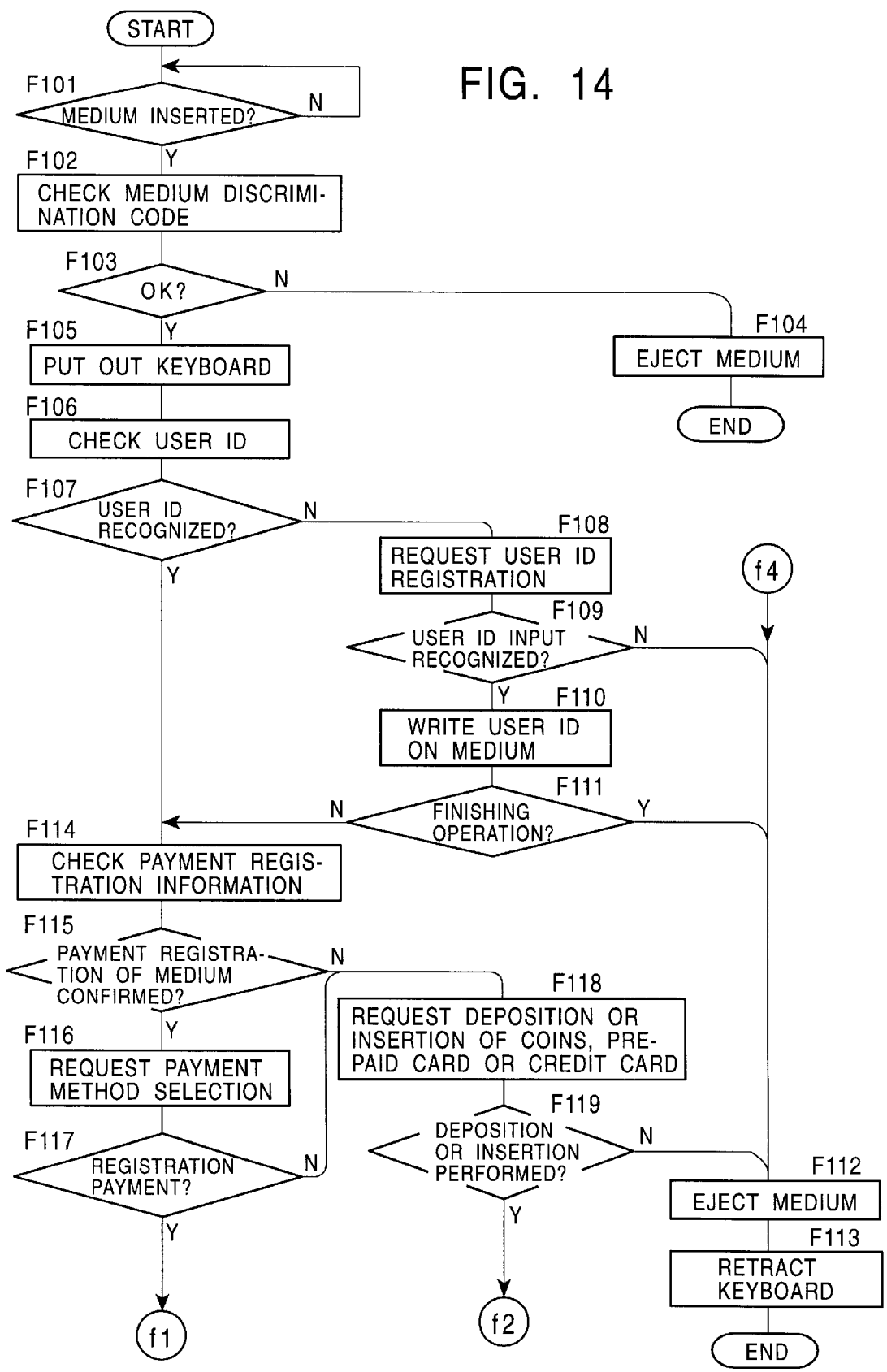
FIG. 14 is a flowchart of processing in the public terminal connected to the network in the embodiment of the invention.

After this disk inserting operation, the computer 20 advances the process from step F101 to step F102 as shown in FIG. 14.

In step F102, the computer 20 instructs the disk drive 24 to read the discrimination code from the disk 90, and checks the discrimination code. That is, the computer 20 checks the discrimination code as to whether the disk 90 is suitable for use with the public terminal 1.

If reading of the proper discrimination code results in failure, the computer 20 determines that the disk 90 does not match the use with the public terminal 1. The computer 20 then advances the process from step F103 to step F104 to instruct the tray drive section 22 to eject the disk tray 14, thereby ejecting the disk and terminating the process.

If the proper discrimination code is recognized, the computer 20 advances the process from step F103 to step F105 to instruct the keyboard in/out drive section 26 to put out the keyboard 12. The keyboard 12 is thereby moved to the usable position, as shown in FIG. 4.

Next, in step F106, the computer 20 checks information on the loaded disk 90 as to whether a user ID is written. This checking is performed for determination as to whether the user has completed step S2 shown in FIG. 11.

If the disk 90 has a user ID recorded thereon, that is, if step S2 is completed, the computer 20 advances the process to step F114.

A case where no user ID has been recorded on the disk 90 corresponds to a case where the user has neglected to execute step S2 or a case where user loads the purchased disk 90 in the public terminal 1 to execute step S2.

Therefore, the computer 20 advances the process from step F107 to step F108 to start processing for registration of a user ID on the disk 90, i.e., processing for performing step S2 in the public terminal 1.

In step F108, the computer 20 requests the user to register his or her user ID., That is, the computer 20 makes on the display 11 a display of information that user ID registration will be started, requests the user to input the user ID which is a code freely selected as a personal identification number, and waits for an input for a predetermined time period.

If the user inputs no user ID, or, for example, if the user performs a finishing operation or if no user ID is input in the predetermined time period, the computer 20 advances the process from step F109 to step F112 and instructs the tray drive section 22 to eject the disk tray 22, thereby enabling the disk 90 to be returned to the user. In step F113, the computer 20 instructs the keyboard in/out drive section 26 to retract the keyboard 12, thereby finishing the process.

If the user wishes for user ID registration processing, he or she inputs a code as user ID. In this case, the computer 20 advances the process from step F109 to step F110 and writes the input user ID to the predetermined area of the disk 90.

In the case where the user uses the public terminal 1 only to perform user ID registration, the finishing operation is performed in step F111. In this case, the computer 20 advances the process from step F111 to step F112 and to F113 to finish the process by ejecting the disk 90 and retracting the keyboard 12.

On the other hand, if the user performs an operation such as to continue using the public terminal 1, the computer 20 advances the process from step F111 to step F114.

The computer 20 advances the process to step F114 with respect the loaded disk having the registered user ID (after completion of step S2). From step F114 to step F119, processing for receiving payment of a fee is performed. This processing corresponds to steps S5 and S11 shown in FIG. 11.

First, in step F114, payment registration information on the disk 90 is checked. If the user has completed the procedure for credit card registration payment (payment registration in Step S3), information that registration payment is allowed with respect to the disk 90 exists as payment registration information on the disk 90.

If such data has been recorded, the computer 20 advances the process from step F115 to step F116 to request the user to select a payment method, i.e., registration payment or deposition payment.

Figure 15:
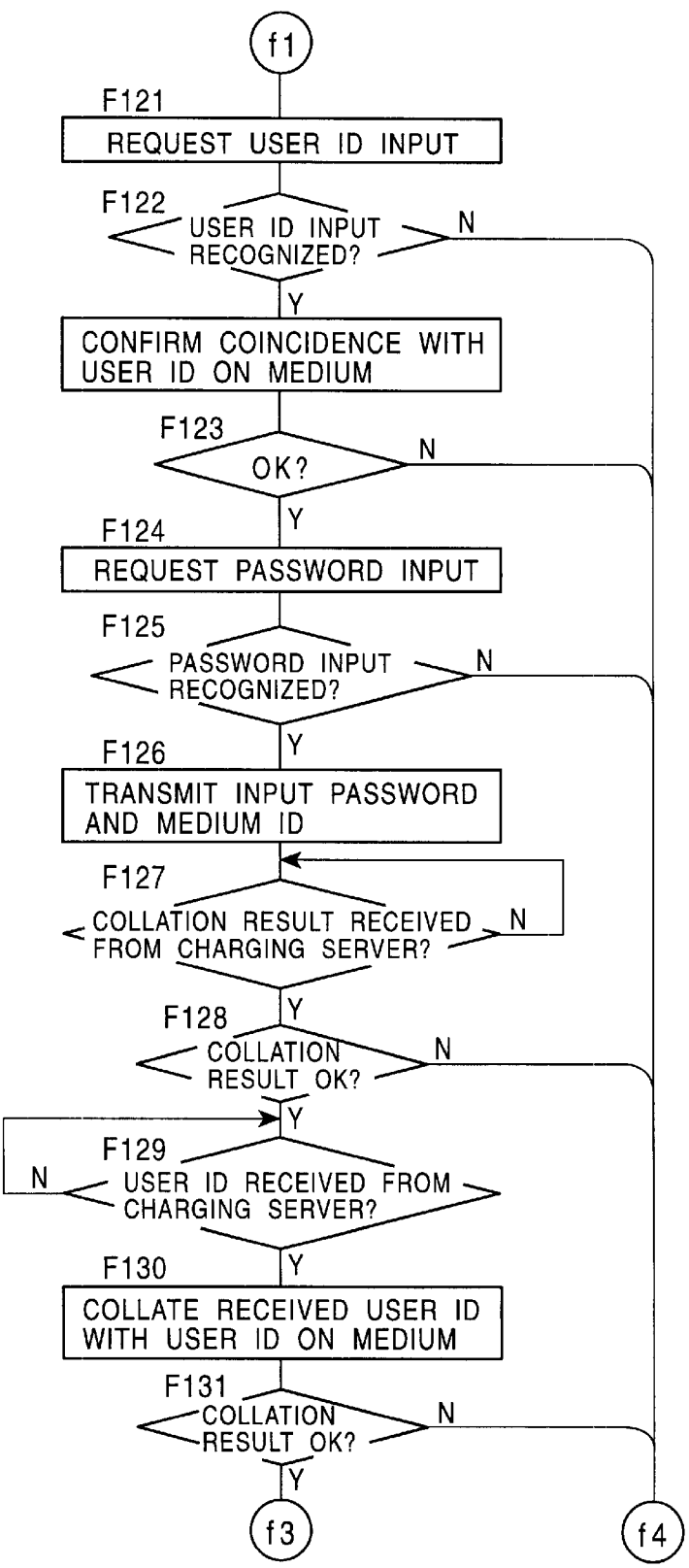
FIG. 15 is another flowchart of processing in the public terminal connected to the network in the embodiment of the invention.

If the use selects registration payment in step F117, the computer 20 advances the process from step F120 shown in FIG. 15 to perform one of various collation processings as use condition confirmation processing corresponding to registration payment.

On the other hand, if the user selects deposition payment in step F117, or it is determined in step F115 that no registration for registration payment has been completed with respect to the disk, the computer 20 advances the process to step F118 and requests the user to deposit or insert coins, a prepaid card or a credit card.

Figure 16:
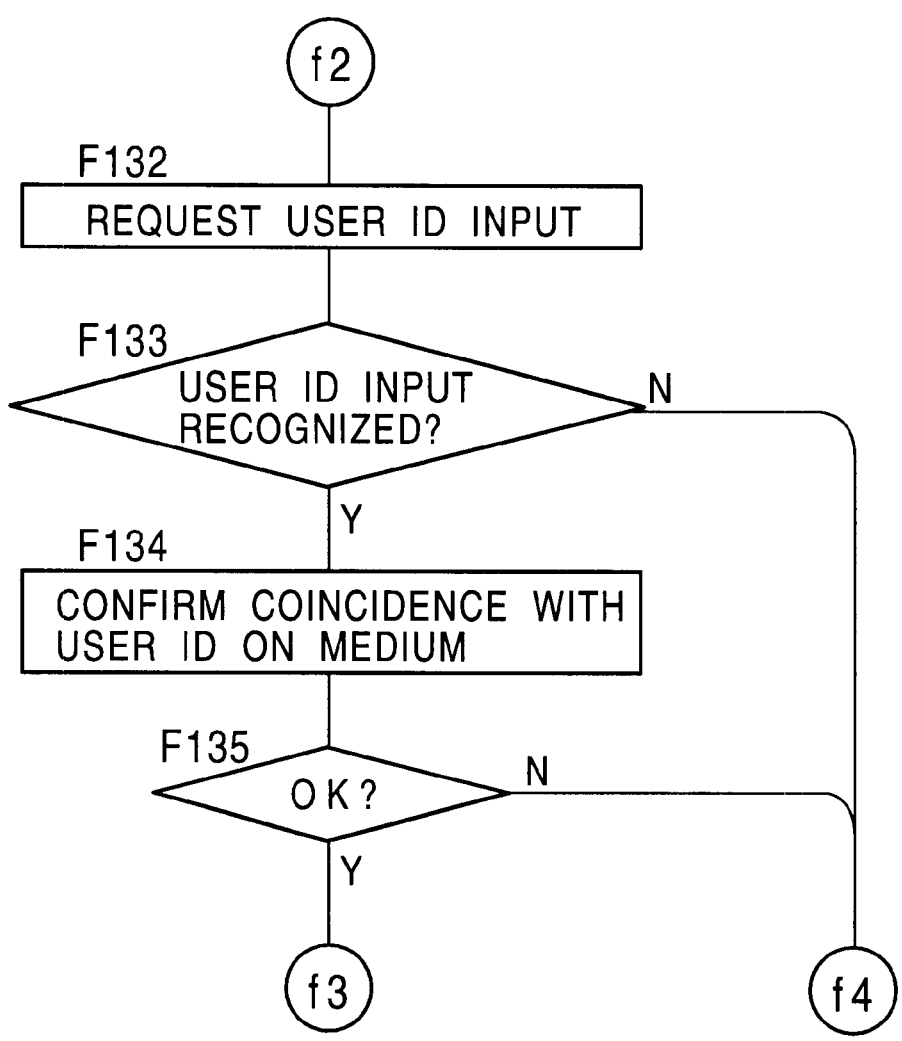
FIG. 16 is another flowchart of processing in the public terminal connected to the network in the embodiment of the invention.

When the user deposits or inserts coins, a prepaid card or a credit card at this request, the computer 20 advances the process to step F132 shown in FIG. 16 to perform collation processing as use condition confirmation processing corresponding to deposition payment.

If the user does not deposit or insert coins, a prepaid card or a credit card, that is, for example, if the user performs a finishing operation without deposition or insertion or the user fails to perform deposition or insertion in a predetermined time period, the computer advances the process from step F119 to step F112 and F113 to finish the process by ejecting the disk 90 and retracting the keyboard 12.

Processing from step F120 is performed as use condition confirmation processing in the case where registration payment is selected in step F117.

First, in step F120, the computer 20 requests the user to input the user ID recorded as a personal identification number on the disk 90.

When the user inputs the user ID, the computer 20 advances the process from step F121 to step F122 to perform checking as to whether the sequence of user ID characters recorded on the disk 90 and the sequence of user ID characters input coincide with each other.

If coincidence of the two sequences of user ID characters is recognized, the computer 20 advances the process from step F123 to step F124 to request the user to input the password, i.e., the personal identification number set by the user at the time of credit card payment registration.

When the password is input, the computer 20 advances the process from step F125 to step F126 to transmit the input password and the medium ID (serial number) recorded on the disk 90 to the charging server 2a via the network 7 after enciphering them.

Then, on the charging server 2a side, processing for collation between the received data and the registered data is performed and a result of this collation is transmitted to the public terminal 1. The public terminal 1 waits until receiving the collation result in step F127.

When a collation result is received from the charging server 2a, the computer 20 checks the content of the received collation result in step F128 and advances the process to step F129 if the collation result is OK.

At this time, the charging server 2a further enciphers and transmits the user ID from the registered data. In step F129, the public terminal 1 waits,until receiving the transmitted user ID.

When the user ID from the charging server 2a is received, the computer 20 deciphers the received user ID and collate the received user ID with the user ID recorded on the disk 90. If the result of this collation is OK, the computer 20 advances the process from step F131 to step F136 shown in FIG. 17 to enable the user to actually use the public terminal 1.

That is, when the affirmative result is obtained in step F131, use condition confirmation processing is completed and it is determined that use of the public terminal 1 by credit card registration payment is allowed. That is, use of the public terminal 1 by the user is recognized as authorized.

If the result of one of steps F121, F123, F125, F128, and F131 in this use condition confirmation processing is NO, it is determined that the conditions for use are not satisfied and that the user is not allowed to use the public terminal 1. That is, such a determination is made in the case where no user ID is input (F121), the case where the input user ID is not correct (F123), the case where no password is input (F125), the case where the result of collation on the charging server 2a side is not OK (F128), or the case where the user ID registered with the charging server 2a and the user ID on the disk 90 do not coincide with each other (F131).

In an event corresponding to one of these cases, the computer 20 advances the process to step F112 and to step F113 shown in FIG. 14 to terminate the process by ejecting the disk 90 and retracting the keyboard 12.

Figure 19:
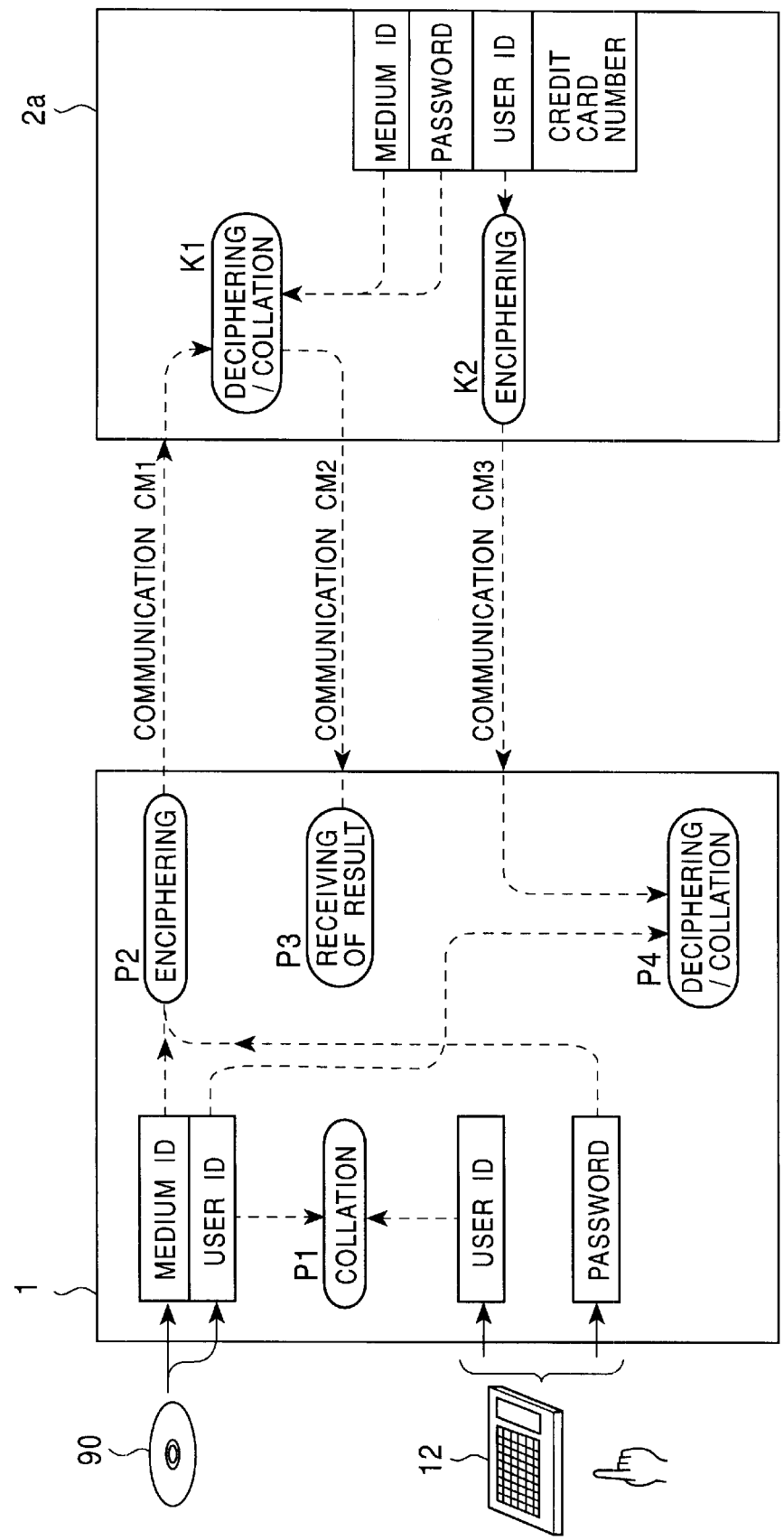
FIG. 19 is a diagram for explaining use condition confirmation processing in the case of registration payment for use of the public terminal connected to the network in the embodiment of the invention.

FIG. 19 shows processing performed by means of communication as use condition confirmation processing shown in FIG. 15 with respect to registration payment.

Disk 90 loaded in public terminal 1 has a medium ID and a user ID recorded thereon, and the computer 20 of the public terminal 1 can read out them.

A user inputs the user ID by using the keyboard 12 at the above-mentioned input request in step F120. Then, processing P1 shown in FIG. 19 is first performed for collation between the user ID on the disk 90 and the input user ID. This processing corresponds to step F122.

The computer 20 then requests the user to input a password, and the user inputs the password by using the keyboard 12.

The computer 20 enciphers the medium ID and the input password by processing P2, and transmits the enciphered medium ID and password to the charging server 2a in communication CM1.

The charging server 2a deciphers the content of communication CM1 to obtain the,medium ID and the password. Payment registration data is stored on the charging server side, as described above with reference to FIG. 13. Processing K1 is performed for checking as to whether registration data exists which corresponds to the combination of the medium ID and the password transmitted to the charging server 2a.

If the user has been properly registered and has input the correct password, the result of this collation is OK. If the user, not knowing the correct password, inputs a wrong password or if the user makes an error in inputting the password, the result of collation is not OK.

This collation result is transmitted from the charging server 2a to the public terminal 1 in communication CM2.

The computer 20 checks the content of communication CM2. This processing corresponds to the processing in steps F127 and F128.

The charging server 2a then enciphers the user ID in the corresponding registration data by processing K2 and transmits the enciphered user data to the public terminal 1 in communication CM3.

The computer 20 of the public terminal 1 deciphers the content of communication CM3 by processing P4 and performs collation between the deciphered user ID and the user ID read from the disk 90. This processing corresponds to steps F129, F130, and F131.

If the result of each of processings P1, P3, and P4 on the public terminal 1 side is OK, the public terminal 1 can be used. This system has improved security for reasons described below.

Collation of the user ID by processing P1 is performed to make determination as to whether the checked person is the user authorized with respect to the disk 90.

Collation by processing K1 is performed to make determination as to whether the checked person is the authorized user who has completed credit card payment registration (who knows the password). The same checking is also performed by processing P4.

These three stages of checking prevent the credit card registration payment system from being used with the disk 90 by an unauthorized person, e.g., a person who has stolen the disk.

The security of the credit card number or the personal identification number is also improved for the following reason.

Since the credit card number and the password are not recorded on the disk 90, another person cannot know them even if the disk 90 is stolen. Also, the credit card number itself is not transmitted by network 7 communication. Therefore, security against communication interception is ensured.

The password and the medium ID are transmitted after being enciphered. The user ID is also transmitted after being enciphered. Therefore, even if the information transmitted in communication is intercepted, the password and so on cannot be deciphered.

Even if they are deciphered, there is substantially no possibility of the combination of the password, medium ID and user ID being stolen at a time by interception of one communication path because communication CM1 of the password and the medium ID and communication CM3 of the user ID are performed separately from each other. In particular, in communication on the network, a communication channel is set for each communication. Therefore, it is next to impossible to intercept, in communication at a certain time, communication CM3 relating to communication CM1 performed at a different time.

Therefore, there is substantially no possibility of the combination of the password, medium ID and user ID being stolen.

Consequently, public terminal 1 can be used by performing payment based on credit card registration while a high degree of security of the system is maintained.

In the case of use of public terminal 1 with deposition payment, such a high degree of security is not required.

Therefore, use condition confirmation processing performed in the case of execution of deposition payment from step F119 shown in FIG. 14 is as represented by step 132 and other subsequent steps shown in FIG. 16.

First, in step F132, the computer 20 requests the user to input the user ID recorded as a personal identification number on the disk 90.

After the user has input the user ID, the computer 20 advances the process from step F133 to step F134 to perform checking as to whether the sequence of user ID characters recorded on the disk 90 and the sequence of user ID characters input coincide with each other.

Figure 17:
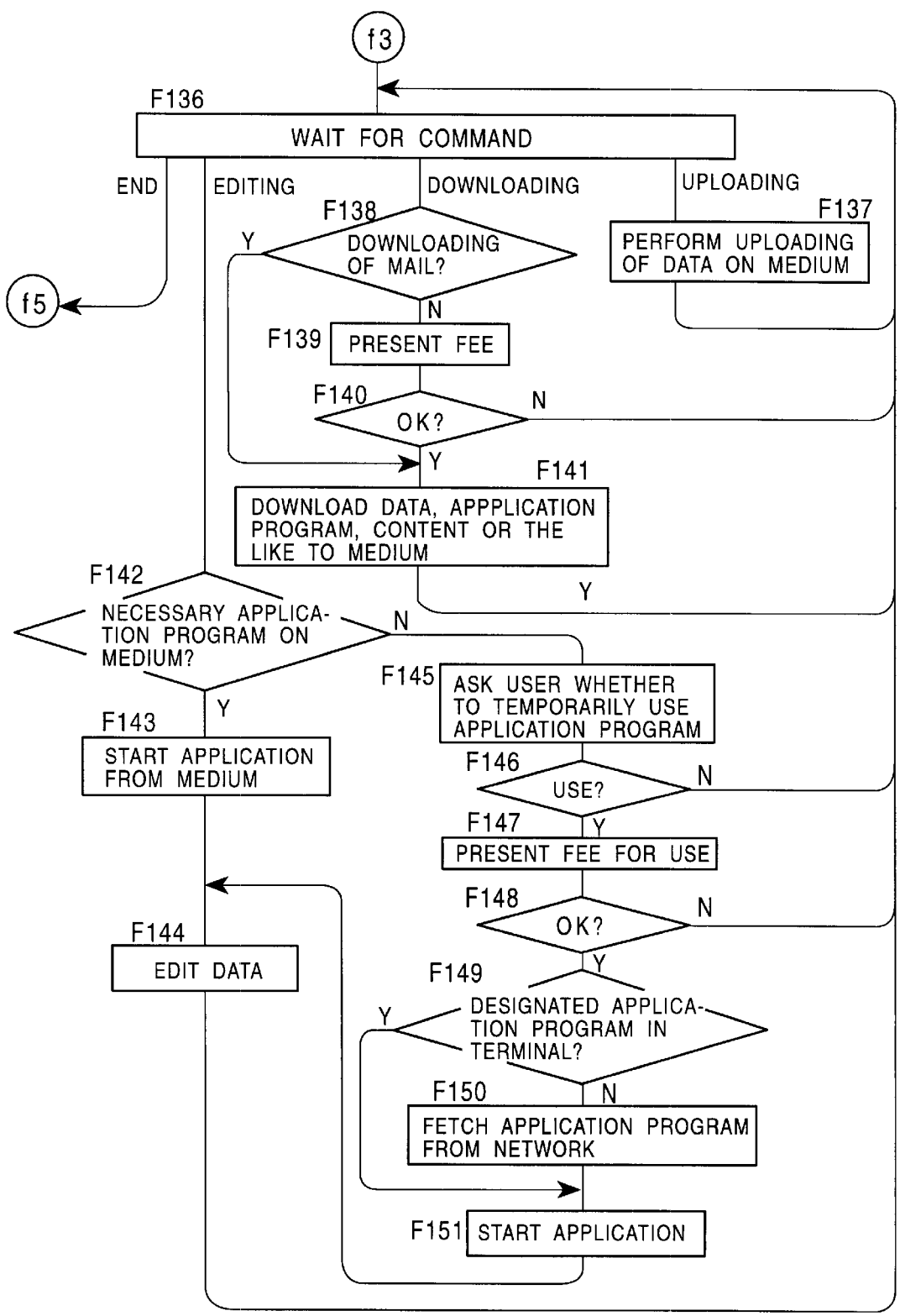
FIG. 17 is another flowchart of processing in the public terminal connected to the network in the embodiment of the invention.
Figure 18:
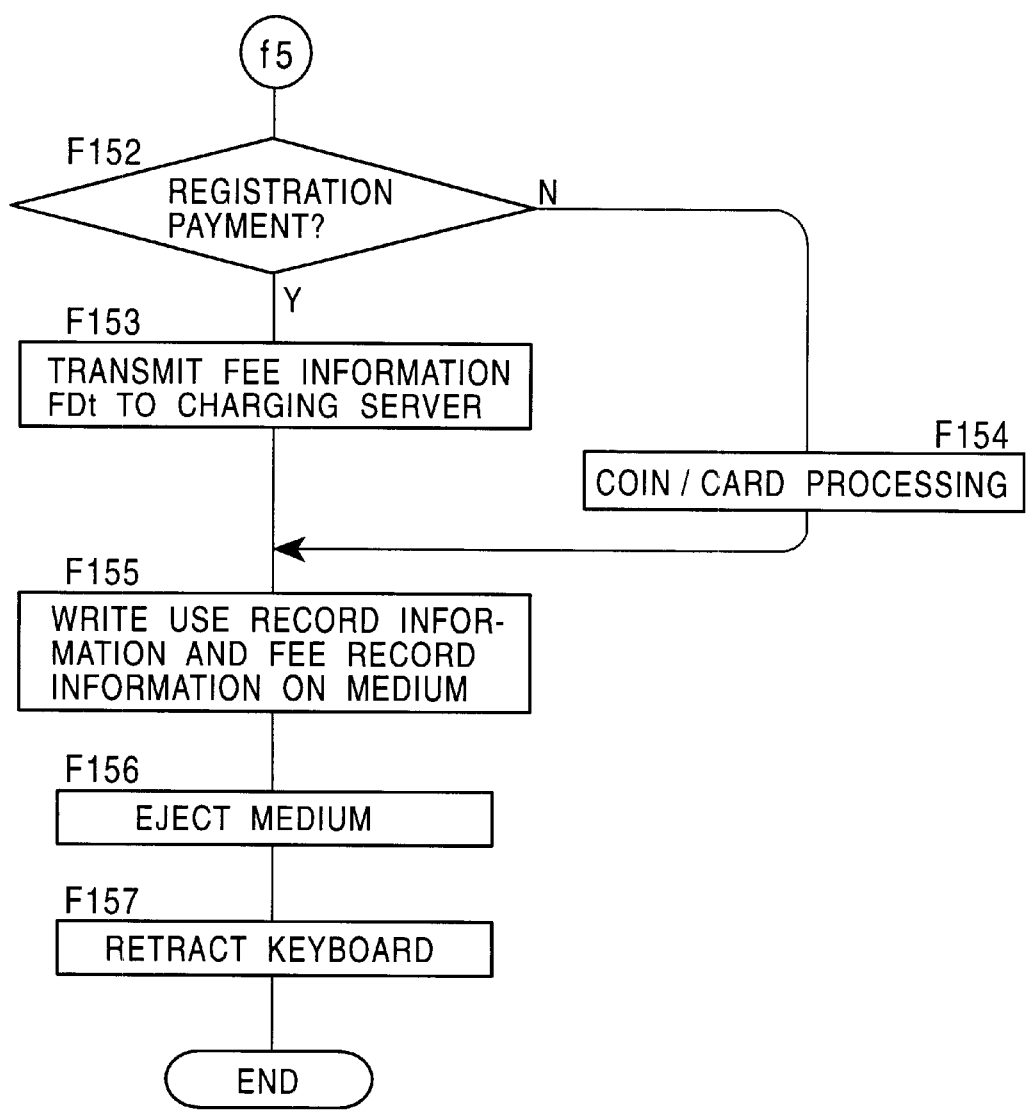
FIG. 18 is another flowchart of processing in the public terminal connected to the network in the embodiment of the invention.

If the two sequences of user ID characters coincide with each other, the computer 20 advances the process from step F135 to step F136 shown in FIG. 17 to enable the user to actually use of the public terminal 1.

When the checked person is identified as the authorized user according to the affirmative result obtained in step F135, use condition confirmation processing is completed to allow the user to use the public terminal 1 with deposition payment.

If the result of one of steps F133 and 135 in this use condition confirmation processing is NO, it is determined that the conditions for use are not satisfied and that the user is not allowed to use the public terminal 1. That is, if no user ID is input (F133), or if the input user ID is not correct (F135), the computer 20 advances the process to step F112 and to step F113 to terminate the process by ejecting the disk 90 and the keyboard 12. That is, the computer 20 determines that the checked person is not the authorized user with respect to the disk 90, and terminates the process.

With the advancement of the process to step F136 shown in FIG. 17, the user is allowed to start downloading using the public terminal 1.

In step F136, the computer 20 waits for a command input by a user's keyboard operation.

If the user performs an operation for starting uploading of data from the disk 90, the computer 20 advances the process to step F137 and uploads the data designated according to the operation from the disk 90 to the hard disk drive 21 or to the network.

This processing enables the user to upload, to the computer system, data previously written to the user's disk 90 by using public terminal 1 or a user's personal computer to provide the data to other particular persons or many and unspecified persons.

For example, the user can transmit an electronic mail or provide a musical composition, images or documents made by the user.

If the user performs an operation for starting downloading of data to the disk 90, the computer 20 advances the process to step F138 and starts processing for downloading information designated according to the operation to the disk 90.

Information to be downloaded is, for example, an electronic mail sent to the user, an application program not possessed by the user, an electronic publication, and a content of a medium such as a piece of music.

In step F138, the computer 20 makes a determination as to whether the downloading object is an electronic mail. (Determination with respect to an electronic mail is only an example and determination in this step may be made as to whether the downloading object is downloadable without charge.)

If the downloading object is an electronic mail, the computer 20 advances the process directly to step F141 to download the designated information (electronic mail) to the disk 90.

If the user requests downloading of an application program, a content of a medium or the like (i.e., downloading of pay information), the computer 20 presents a fee for downloading in step F139 since downloading of a pay application program or content corresponds to purchase of the program or content. The computer 20 then waits for a user's operation. If the user performs an OK operation agreeing to the fee, the computer 20 advances the process from step F140 to step F141 to execute downloading to the disk 90 of the pay data which is an application program, a content of a medium or the like. If the user performs no OK operation with respect to the fee presentation, the computer 20 returns the process from step F140 to step F136 without executing downloading.

If an application program or a content of medium designated as a downloading object is provided without charge, processing in steps F139 and F140 is unnecessary.

The above-described downloading processing enables the user to receive from public terminal 1 an electronic mail or the like addressed to the user or to obtain an application program or a content of a medium which the user wants to purchase.

If the user performs an operation for starting editing for updating a data file or newly making a data file, the computer 20 advances the process to step F142 and ascertains whether an application program necessary for corresponding editing processing exists on the disk 90.

If the necessary application program exists on the disk 90, the computer 20 starts the necessary application program recorded on the disk 90 in step F143. In step F144, the computer 20 executes file editing processing according to user' operations.

In this case, needless to say, the user is charged no application use fee since the application program used is in the possession of the user.

On the other hand, if the computer 20 determines in step F142 that the necessary application does not exist on the disk 90, it asks the user in step F145 whether the user will use the corresponding application held in the computer system to execute user's editing.

If the computer 20 recognizes in step F146 a user's intention to use the application program, it presents a fee for use of the application in step F147.

If the user performs an operation corresponding to agreement to the fee, the computer 20 advances step F148 to step F149 and ascertains whether the corresponding application program exists in the public terminal 1, i.e., in the hard disk drive 21.

If the application program exists, the computer 20 starts it in step F151. If the application program does not exist, the computer 20 loads the public terminal 1 with the necessary application program from the network (e.g., from application server 5a) in step F150 and starts the loaded application program in step F151.

After starting the application program in step F151, the computer 20 executes file editing processing according to user's operations.

In this case, the mode of use is such that the user temporarily rents the application program, and the fee presented in step F147 is a rental fee of this renting.

If the user does not perform the agreeing operation in step F146 or 148, editing processing cannot be performed. However, since this is due to the absence of a user's intention to rent the application program or user's agreement to the fee, the user may download or purchase the application program by the above-described downloading processing to execute the desired editing processing.

The user may previously download the necessary application from a personal computer or the like in his or her possession to the disk 90 to perform the desired processing without purchasing or renting the application program in the public terminal 1.

As described above, the user can perform various operations such as uploading, downloading and editing by using public terminal 1.

When the desired processing is completed, the user performs finishing operation. In response to this operation, the computer 20 advances the process from step F136 to step F152 shown in FIG. 18.

In step F152, a determination is made as to whether the present use of the public terminal 1 is in combination with registration payment. In the case of registration payment, information of fees which the user is demanded to pay is transmitted to the charging server 2a in step F153. For example, information of a public terminal use time period and a public terminal use fee, and information of an application purchase fee and an application name, information of a content use fee, a content use time period and a content name, or information of a content purchase fee and a content name are transmitted to the charging server 2a. Then, as described above with reference to FIG. 1, the charging server 2a makes a demand on the credit card company 3 based on the information, as described above with reference to FIG. 1. The credit card company 3 receives from a user's bank account the corresponding amount of money and pays the fees to the corresponding organizations in the public terminal management company 2, the contents company 4, the application company 5, etc.

If it is determined in step F152 that the present use of the public terminal 1 is in combination with deposition payment, charging processing is performed with respect to deposited coins or an inserted prepaid card or credit card. Information of this charging is set to, for example, the public telephone management company 6, and the public telephone management company 6 pays the necessary fees to the corresponding organizations.

In step F155, the computer 20 writes to the disk 90 use record information and fee record information having contents such as those shown in FIGS. 9 and 10 according to details of the present use of the public terminal 1.

The disk 90 is ejected in step F156 and the keyboard 12 is retracted in step F157, thereby finishing the process.

Processing is performed in the public terminal 1 as described above. The above-described processing, however, is only an example of the overall processing in the system. In the terminal with which the payment method is limited to registration payment, no processing corresponding to deposition payment is performed regardless of whether the terminal is of the type A or B. In the terminal with which the payment method is limited to deposition payment, no processing corresponding to registration payment is performed.

Needless to say, in a system in which public terminal 1 can be used without charge, no processing corresponding to registration payment or deposition payment is performed.

[III] Non-network Computer System

III-1. Construction of Public Terminal

A description will next be given of a computer system using public terminals corresponding to type-C public terminal 1 described above with reference to FIGS. 1 and 2, which are not connected to network 7. In an example of the system described below, terminals are provided for free use by many and unspecified users.

Figure 20:
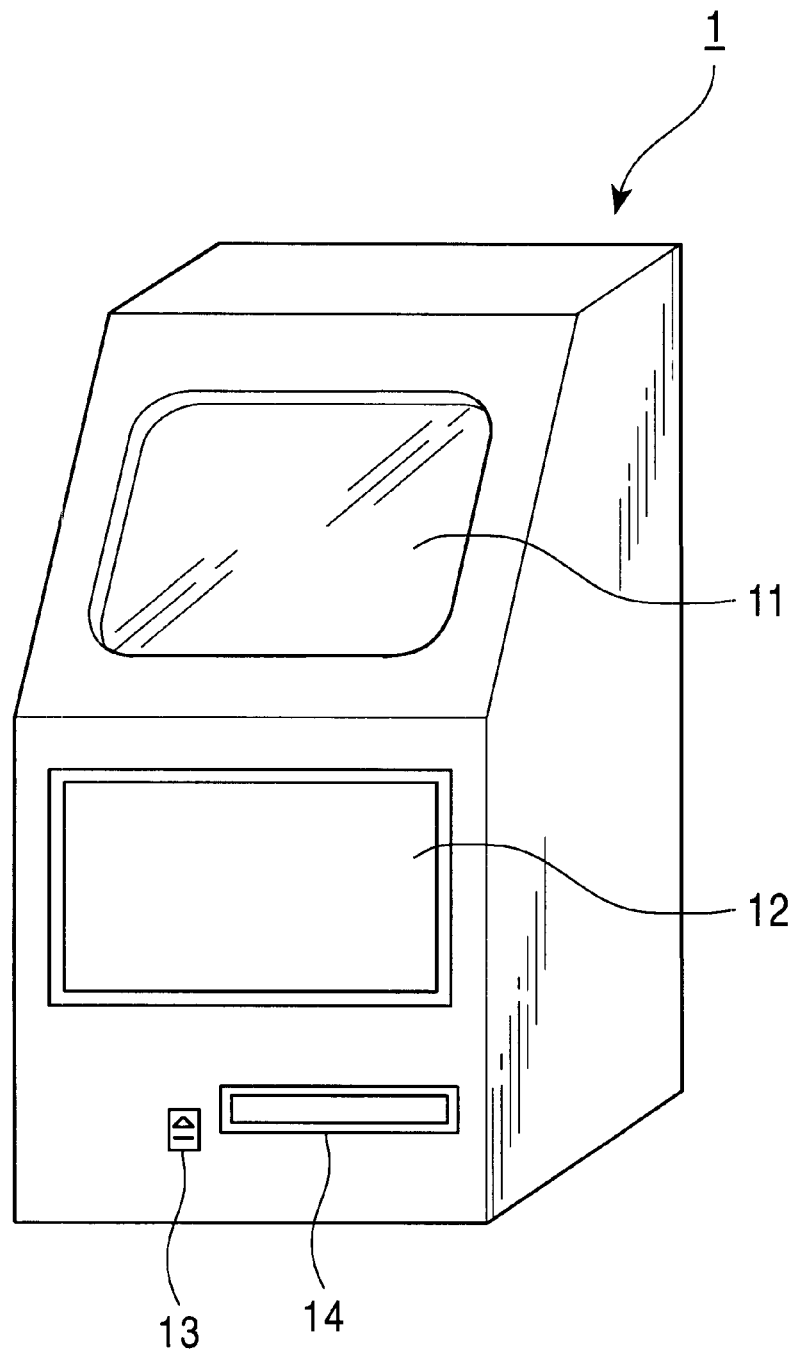
FIG. 20 is a diagram showing an external appearance of the public terminal not connected to the network in the embodiment of the invention.
Figure 21:
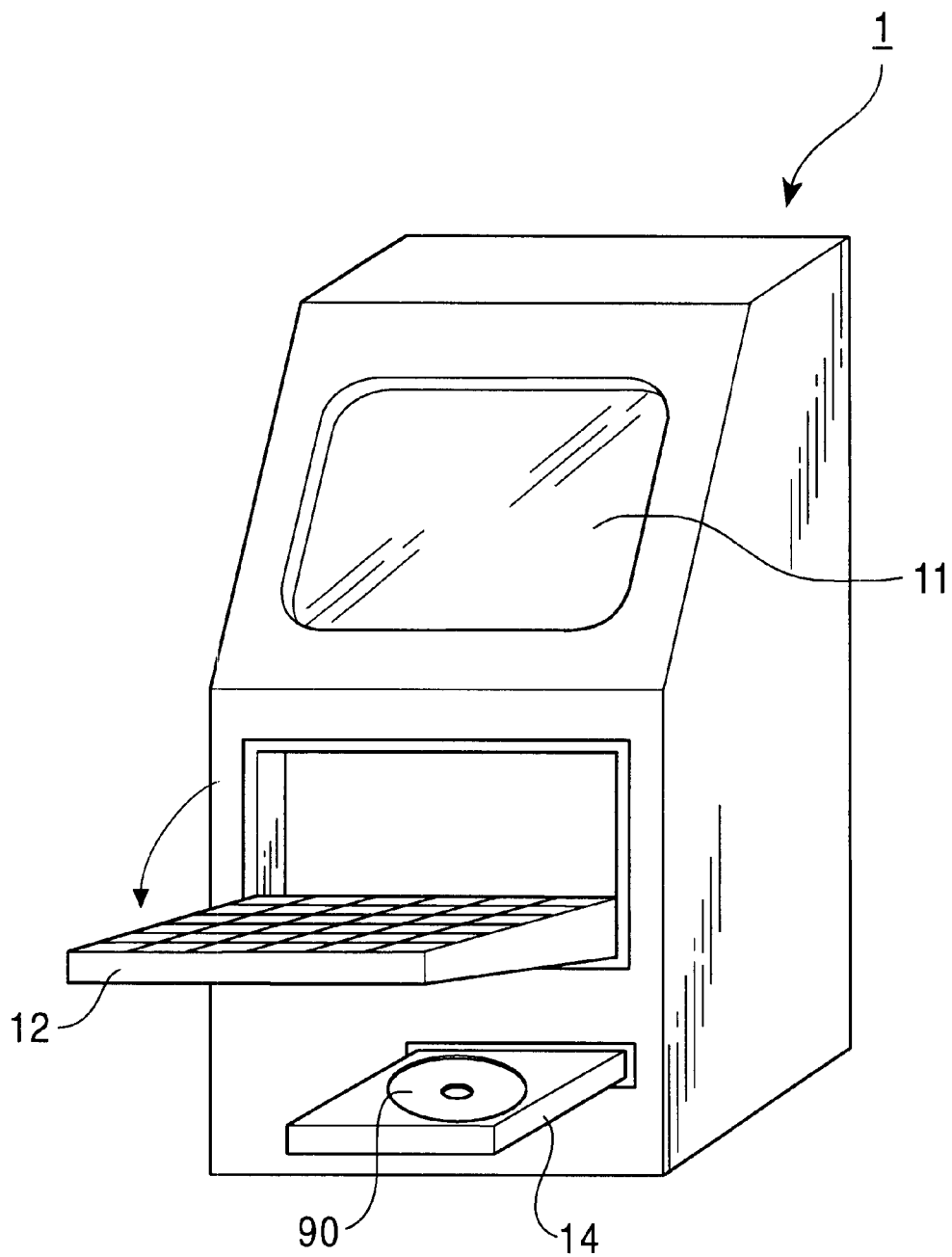
FIG. 21 is a diagram showing another external appearance of the public terminal not connected to the network in the embodiment of the invention.

FIGS. 20 and 21 show an external appearance of type-C public terminal 1 in this example. This public terminal 1 is connected to no network and to no telephone line and has no public telephone function. If they are used free of charge, no section for charging is required. Therefore, the terminal may have only a display 11, a keyboard 12, an eject key 13 and a disk tray 14 as components seen in an external appearance, as illustrated.

The keyboard 14 may be of a drawn-out type such as that illustrated in FIGS. 3 and 4. In this example, however, it is of a lid type movable from a retracted state shown in FIG. 20 to a usable state shown in FIG. 21. That is, the keyboard 12 is in a closed position in a front portion of the public terminal 1 as shown in FIG. 20 when it is not used. When it is used, it is swung to a usable position as shown in FIG. 21. This terminal is also arranged so that the operation for swingingly moving the keyboard 21 is automatically performed at the time of a start or finish of use of the public terminal 1. However, the arrangement may alternatively be such that the keyboard 12 is manually moved swingingly by a user when use of the terminal is started or finished.

The display 11, the eject key 13 and the display 14 are the same as those described above and the description for them will not be repeated.

Figure 22:
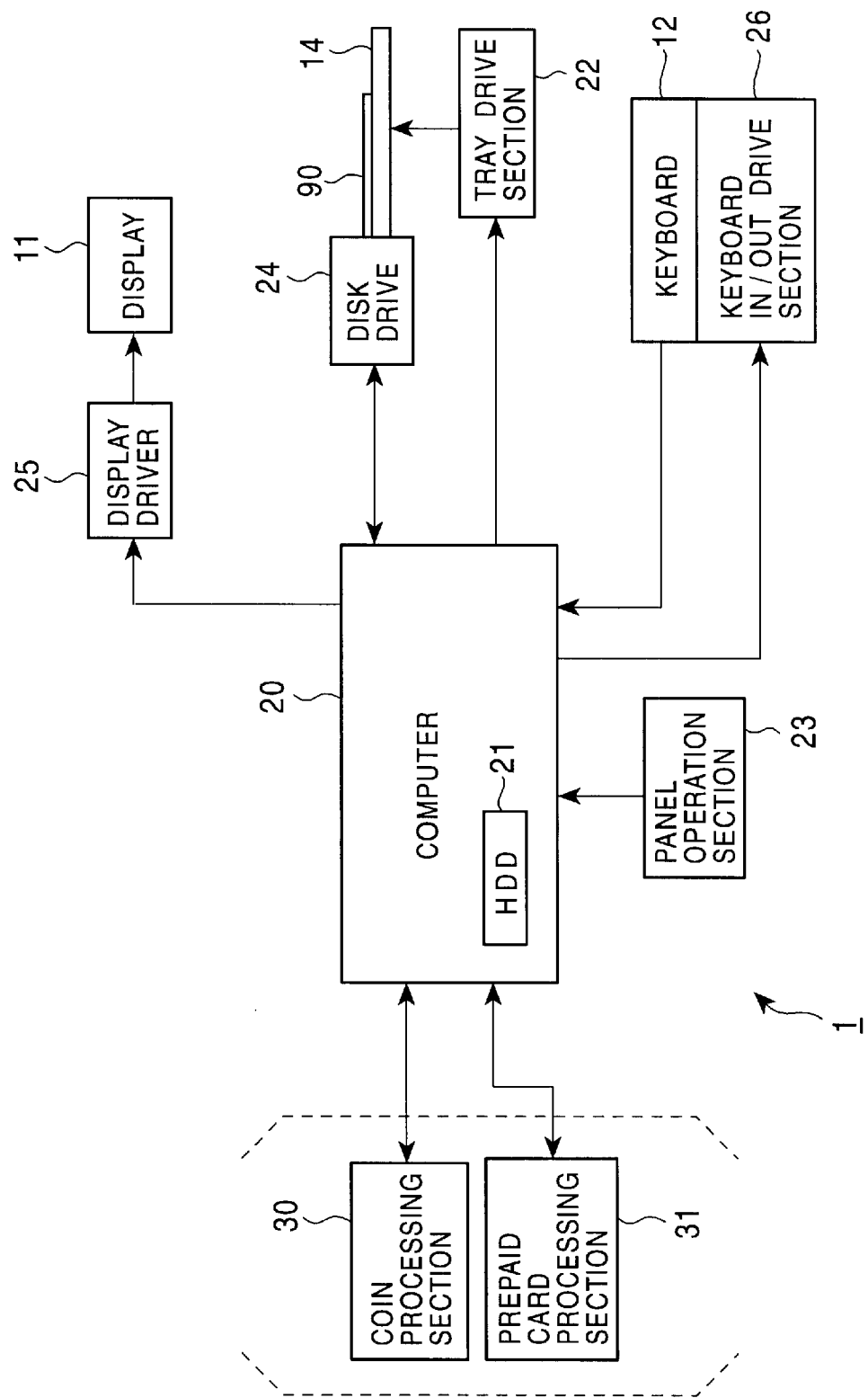
FIG. 22 is a block diagram of the public terminal not connected to the network in the embodiment of the invention.

FIG. 22 shows the internal configuration of the public terminal 1.

The computer 20 does not need to have network computer functions such as those described above by way of example.

Since the terminal is not connected to a network and capable of functioning independently, the terminal is constructed in such a manner that the functional sections relating to the network are removed from the arrangement shown in FIG. 5.

The computer 20 has an internal recording medium, e.g., a hard disk drive 21.

As input devices for the computer 20, a panel operation section 23 (eject key 13) and the keyboard 12 are provided. The keyboard 12 is swingingly driven by a keyboard in/out section 26.

In a disk drive 24, data is recorded on a disk 90 loaded on a disk dray 14 or data is reproduced from the disk 90.

A disk tray drive section 22 ejects or retracts the disk tray according to an instruction from the computer 20.

The disk drive 24 performs recording or reproducing operation when required by the computer 20 to record data on disk 90 loaded in the disk drive 24 or reproduce data from the disk 90.

The display 11 displays, in computer processing/operating monitoring windows, a graphic image for a graphic user interface (GUI), letters of sentences or images during word or image processing, and the like. The computer 20 supplies a display driver 25 with information which is to be displayed, and the display driver 25 makes a display of the information on the display 11.

These sections operate in the same manner as those described above with reference to FIG. 5 and a further detailed description will not be made for them.

The public terminal 1 may be adapted to pay use. However, since the terminal has no communication function, only a charging system using coin or prepaid card deposition payment can be used. If such a fee-charging system is used, a coin processing section 30 and a prepaid card processing section 31 are provided as shown in parentheses in FIG. 22. In such a case, a coin slot and a prepaid card slot, not shown in FIGS. 20 and 21, are formed in the body of the terminal.

Type-C public terminal 1 is thus constructed. However, it is not always necessary to provide all the above-described components, and other components not illustrated may be provided. For example, modifications, such as those described with respect to the arrangement shown in FIG. 5, characterized by provision of a printer or use of a mouse, are also conceivable.

III-2 Processing in Public Terminal

Figure 23:
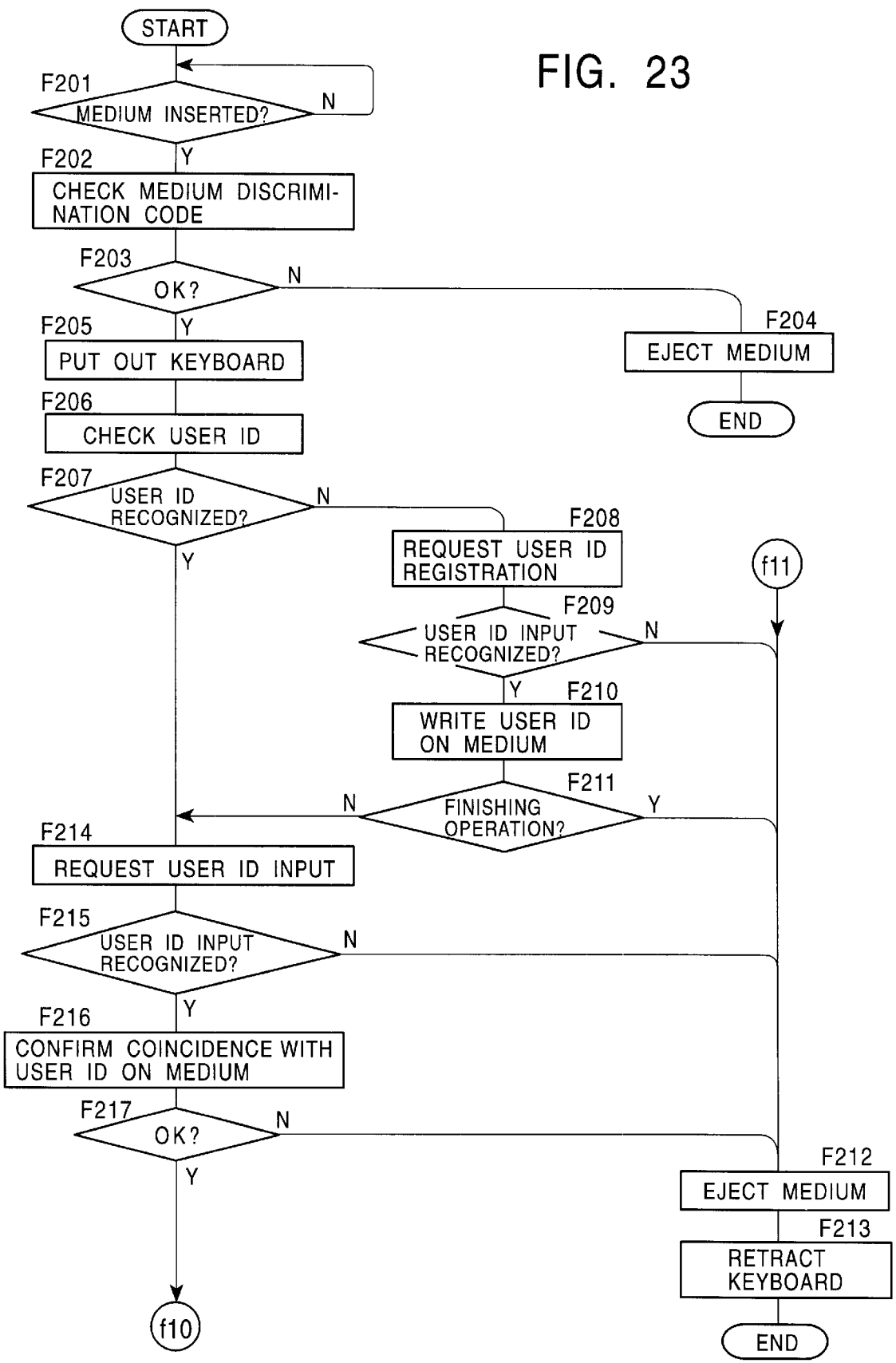
FIG. 23 is a flowchart of processing in the public terminal not connected to the network in the embodiment of the invention.

Processing performed by the computer 20 of the thus-constructed type-C public terminal 1 will be described with reference to FIGS. 23 and 24. Disk 90 used in this public terminal is the same as that used in the above-described type-A and type-B public terminals 1. Since the computer system is used free of charge, the procedure for use by a user is as represented only by steps S1→S2→S10→S12→S13→S15→S16 shown in FIG. 11.

This public terminal 1 is maintained in a standby state, such as shown in FIG. 20, in an installation place. When a user loads disk 90 in the terminal, the process shown in FIGS. 23 and 24 is started. A disk inserting operation is performed, which corresponds to the procedure consisting of the operation of the eject key 13, the placement of the disk on the disk tray 14 and the operation of the eject key 13 performed by the user. Then, the computer 20 advances the process from step F201 to step F202 shown in FIG. 23.

Processing from step F201 to step F211 is the same as that from step F101 to step F111 shown in FIG. 14 and detailed description for it will not be repeated. That is, by this processing, checking of a discrimination code of the loaded disk 90 and ejection of the keyboard 12 are performed and a user ID is checked for determination as to whether it has been registered. If no user ID has been registered with respect to the disk and if the user wishes to have a user ID registered by ID registration processing, processing for writing a user ID input by the user to a predetermined area of the disk 90 is performed.

In a situation where the user loads a disk 90 with a registered user ID (already processed by step S2 shown in FIG. 11), the computer 20 normally advances the process to step F214 to start use condition confirmation processing. In this processing, the computer 20 requests the user to input the user ID recorded as a personal identification number on the disk 90.

After the user has input the user ID, the computer 20 advances the process from step F125 to step F216 to perform checking as to whether the sequence of user ID characters recorded on the disk 90 and the sequence of user ID characters input by the user coincide with each other.

Figure 24:
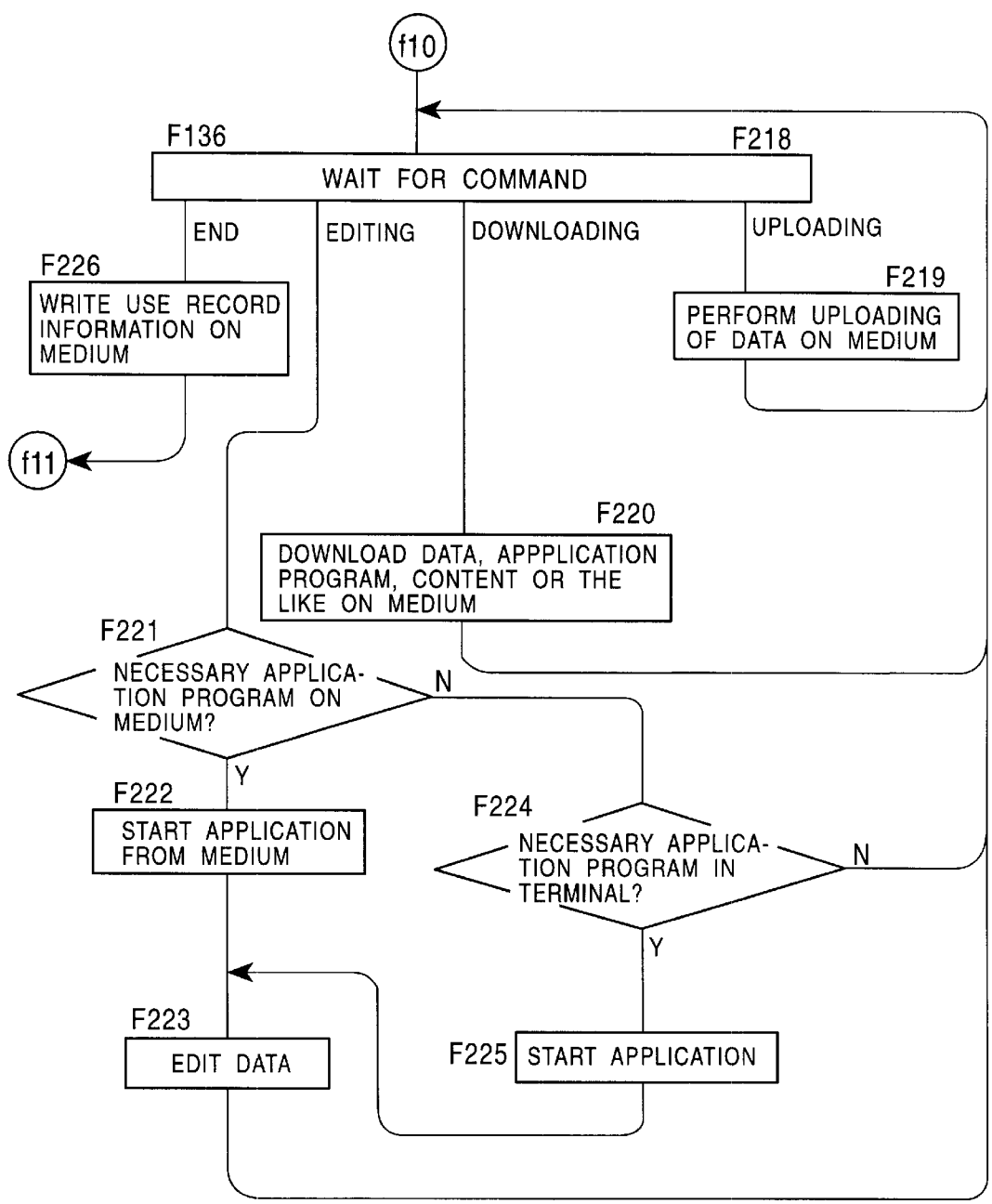
FIG. 24 is another flowchart of processing in the public terminal not connected to the network in the embodiment of the invention.

If the two sequences of user ID characters coincide with each other, the computer 20 advances the process from step F217 to step F218 shown in FIG. 24 to enable the user to actually use the public terminal 1.

If the result of one of steps F215 and 217 is NO, that is, if no user ID is input, or if the input user ID is not correct, the computer 20 determines that the checked person is not the authorized user with respect to the disk 90, and advances the process to step F212 and to step F213 to terminate the process by ejecting the disk 90 and by retracting the keyboard 12.

With the advancement of the process to step F218, the user is allowed to start downloading using the public terminal 1. In step F218, the computer 20 waits for a command input by a user's keyboard operation.

If the user performs an operation for starting uploading of data from the disk 90, the computer 20 advances the process to step F219 and uploads the data designated according to the operation from the disk 90 to the hard disk drive 21.

This processing enables the user to upload, to the computer system, data previously written to the user's disk 90 by using public terminal 1 or user's personal computer to provide the data to other particular persons or many and unspecified persons.

If the user performs an operation for starting downloading of data to the disk 90, the computer 20 advances the process to step F220 and starts processing for downloading information designated according to the operation to the disk 90. That is, information designated by the user is downloaded to the disk 90 from a data file, an electronic mail, an application program, a content of a medium, etc. recorded in, for example, the hard disk drive 21.

This downloading processing enables the user to obtain various sorts of information from the public terminal 1.

If the user performs an operation for starting editing for updating a data file or newly making a data file, the computer 20 advances the process to step F221 and ascertains whether an application program necessary for corresponding editing processing exists on the disk 90.

If the necessary application program exists on the disk 90, the computer 20 starts the necessary application program recorded on the disk 90 in step F222. In step F223, the computer 20 executes file editing processing according to user' operations.

Since in this example application programs can be used free of charge, the necessary application program in the hard disk drive 21 may be started even if the same application program exists on the disk 90.

If the necessary application program does not exist on the disk 90 and in the hard disk drive, the desired editing operation can not be performed.

As described above, the user can perform various operations such as uploading, downloading and editing by using public terminal 1.

When the desired processing is completed, the user performs finishing operation. In response to this operation, the computer 20 advances the process from step F226 and writes on the disk 90 use record information having contents such as shown in FIG. 9 according to details of the use of the public terminal 1 just finished.

The computer 20 finishes the process by ejecting the disk 90 in step F212 and retracting the keyboard 12 in step F213.

Processing is performed in the public terminal 1 as described above. The above-described processing, however, is only an example of the overall processing in the system. If the computer system is formed as a fee-charging system requiring deposition payment in coin or the like, it includes additional processings, e.g., processing for requesting deposition of coins or the like at the time of starting use, processing for presenting a fee at the time of executing downloading, processing for presenting a fee at the time of finishing use, and processing for writing fee record information such as shown in FIG. 10.

With a system formed of public terminals 1 constructed as described above without network, information cannot be distributed through an area as wide as a networked area. However, such a system is useful in terms of installation facility. The public terminal 1 without network connection can also used suitably as a public terminal usable only by persons in a particular region, e.g., those in a particular organization such as a school or an enterprise.

As can be understood from the foregoing, the present invention can be realized as a,computer system which is useful, safe and convenient, and which can readily be used by many and unspecified users.

According to the present invention, if many and unspecified users possess a certain recording medium, they can execute processing according to their needs by using computer terminals (public terminals) provided for the public and can collect and process information using computers and a network. According to the present invention, a user can execute necessary processing without forming a computer system or a network computer system by himself or herself, and even a user who possesses a personal computer can execute necessary processing by using one of computer terminals installed in various places.

The present invention enables a greater number of people to enjoy the benefits of information processing systems.

Further the computer system of the present invention becomes usable according to.a result of use condition confirmation processing. Therefore, unauthorized use, e.g., use of a recording medium by a person different form the possessor of the medium can be prevented.

According to the present invention, a discrimination code information for discriminating a medium adapted to the computer system from others is recorded on the medium. This discrimination code is used for use condition confirmation processing to enable only the recording medium suitable for use in the system to be used, thereby preventing erroneous use of the medium and a file damaging accident or the like caused by erroneous use.

According to the present invention, a user records, on his or her recording medium, user ID information for the same function as a personal, identification number to improve security against unauthorized use.

According to the present invention, a user can write user ID information on his or her recording medium by using one computer terminal. Therefore, a user who wants to use the computer system is not required to possess a special ID writing device or personal computer, so that use by a larger number of persons can be promoted.

According to the present invention, serial number information provided on each of pieces of a recording medium is used for use condition confirmation processing. This is also effective in improving security for preventing unauthorized use.

According to the present invention, use condition confirmation processing is performed by using serial number information provided on each of pieces of a recording medium, user ID information, a password input by a user and a user collation information held in a server system, thereby ensuring security with respect to processing on the network.

According to the present invention, processing using user collation information in use condition confirmation processing is performed between each computer terminal and the server system by communicating serial number information, user ID information and password information. Also, this communication of serial number information, user ID information and password information is executed by being separated into at least two communications. Therefore, there is substantially no possibility of all the serial number information, user ID information and password information being stolen on the network, thus realizing a high degree of security.

According to the present invention, information about a fee for use of each computer terminal can be held and checked by the server system, thereby enabling formation of a fee payment system using a credit card, for example.

According to the present invention, each computer terminal itself can perform fee collection corresponding to payment in coin or use of a currency substitute card. For example, a user can use each computer terminal by using a simpler fee payment method without credit card registration or the like.

According to the present invention, each computer terminal can execute various processings by using software recorded on a recording medium in the possession of a user or software recorded by an internal storage means of the computer terminal, thus increasing a variety of processings. If availability of software in the possession of users is taken into consideration, it can be said that it is possible to eliminate the need for preparing all the necessary software units such as application programs on the computer terminal side.

For users, this means that a program not possessed by a user can be used by the user if it exists on the computer terminal side.

According to the present invention, a user can download any information prepared in one computer terminal to his or her recording medium, thus facilitating collection and purchase of information.

According to the present invention, a user can download, to his or her recording medium, information provided as a content of a medium from a contents server by using one computer terminal. Therefore, a pay of free system for providing contents of media (music, documents, publications such as newspapers, images, etc.) to many and unspecified persons can be formed.

According to the present invention, use record information about use of some computer terminals is recorded on a recording medium in the possession of a user, thereby enabling the user to confirm the contents of past use.

According to the present invention, fee record information in which amounts charged according use of computer terminals is written is recorded on a recording medium in the possession of a user, thereby enabling the user to confirm fees according to the states of execution of past use. This information may have an effect similar to that of a receipt.

According to the present invention, each computer terminal may be constructed so that input section is can be handled at the time of use only and is retracted to an unusable position when not used, thereby preventing a key on the keyboard from being inadvertently pressed or from being damaged or contaminated. This construction is suitable for installation at a store front, for example.

What is claimed is:

1. A computer system comprising:

a computer terminal;

a server system communicably connected to said computer terminal; and a recording medium detachably loaded in said computer terminal to be used for recording information and reproducing information, said computer terminal including:

condition confirmation means for performing conditional use confirmation for use of the processing terminal using information recorded on said recording medium loaded, and control means for enabling use of each of a plurality of different processes according to a result of the confirmation processing performed by said condition confirmation means, said control means executing communication with said server system of information necessary for the condition confirmation processing with respect to use of said computer terminal and one of the various processes executed as use of said computer terminal.

2. A computer system according to claim 1, wherein discrimination code information which enables said recording medium to be recognized as a recording medium adapted to the computer system is recorded on said recording medium, and said use condition confirmation means performs the use condition confirmation processing based on the discrimination code information.

3. A computer system according to claim 1, wherein user identification information freely set by a user is recorded on said recording medium, and said use condition confirmation means performs the use condition confirmation processing based on the user identification information.

4. A computer system according to claim 3, wherein said computer terminal further includes recording means for recording information input by the user as said user identification information on the loaded recording medium.

5. A computer system according to claim 1, wherein one of items of serial number information respectively provided for a plurality of recording mediums adapted to the downloading system is recorded on said recording medium, and said use condition confirmation means performs the use condition confirmation processing based on said serial number information.

6. A computer system according to claim 1, wherein serial number information to be provided on each of recording mediums adapted to the computer system is recorded on said recording medium, and an area usable for recording user identification information freely set by a user is defined on said recording medium, wherein user identification information freely set by users, serial number information of the recording medium used by each of the users and password information freely set by each of the users are registered as user collation information in said server system, and wherein said use condition confirmation means performs the use condition confirmation processing based on password information input by the user, the serial number information and the user identification information recorded on said recording medium, and the user collation information registered in said server system.

7. A computer system according to claim 6, wherein said use condition confirmation means performs the use condition confirmation processing by communicating serial number information, user identification information and password information between said computer terminal and said server system, the communication of serial number information, user identification information and password information being executed by being separated into at least two communications.

8. A computer system according to claim 6, wherein payment information of payment methods for the users is registered in said server system by being related to the user collation information, and
   wherein said computer terminal communicates fee information to said server system, and said server system performs fee charging management with respect to the users by using the fee information and the payment information.

9. A computer system according to claim 1, wherein said computer terminal further includes fee collection means for collecting a fee paid in currency or with a currency substitute card.

10. A computer system according to claim 1, further comprising internal storage means for storing application software, wherein one of the various processes is executed by using at least one of application software recorded on the loaded recording medium and application software stored in said internal storage means, and data obtained as a result of execution of the process is recorded on the loaded medium.

11. A computer system according to claim 1, wherein said computer terminal includes internal storage means for storing at least one of application software and contents of media, and can download information stored in said internal storage means to the loaded recording medium.

12. A computer system according to claim 1, wherein said server system comprises a contents server which provides contents of media, and
   wherein said computer terminal can download, to the loaded recording medium, information provided as a content from said contents server.

13. A computer system according to claim 1, wherein said server system comprises an application server which provides application software, and
   wherein said computer terminal can download, to the loaded recording medium, application software provided from said application server.

14. A computer system according to claim 1, wherein said computer terminal records, on the loaded recording medium, information about some of the processes used by a user, the information being recorded as use record information.

15. A computer system according to claim 1, wherein said computer terminal records, on the loaded recording medium, information about fees charged for some of the processes used by a user, the information being record as fee record information.

16. A computer system according to claim 1, further comprising input means for enabling a user to input information and change means for changing said input means between a usable state and an unusable state,
   said change means setting said input means in the usable state after said recording medium has been loaded in said computer terminal,
   said change means setting said input means in the unusable state when use of said computer terminal is finished.

17. A computer system according to claim 1, wherein said computer terminal has a public telephone function and is connected to a public telephone network, said computer terminal being usable as a public telephone regardless of whether or not the recording medium is loaded.

18. A computer apparatus comprising:
   recording medium drive means capable of reading information from a detachable recording medium and writing information to the detachable recording medium;
   condition confirmation means for performing conditional use confirmation processing for use of the terminal using information recorded on the recording medium when the recording medium is loaded to said drive means; and
   control means for enabling use of the computer apparatus according to a result of the confirmation processing, for forming record information according to processing executed in the computer apparatus, and for recording the record information on the loaded recording medium with said recording medium drive means.

19. A computer apparatus according to claim 18, further comprising communication means communicably connected to a server system,
   wherein communication of: information necessary for at least one of the use condition confirmation processing and various processes executed as use of the computer apparatus is executed between the computer apparatus and said server system through said communication means.

20. A computer apparatus according to claim 18, wherein said use condition confirmation means performs, as the use condition confirmation processing, ascertainment as to whether discrimination code information for enabling the loaded recording medium to be recognized as a recording medium corresponding to the computer apparatus is recorded on the loaded recording medium.

21. A computer apparatus according to claim 18, wherein said use condition confirmation means performs, as the use condition confirmation processing, the process of asking a user to input personal identification number information coinciding with personal identification number information recorded on the loaded recording medium, and performing collation between personal identification number information input by the user and the personal identification number information on the loaded recording medium.

22. A computer apparatus according to claim 18, wherein said use condition confirmation means performs, as the use condition confirmation processing, collation processing using serial number information recorded on the loaded recording medium.

23. A computer apparatus according to claim 18, further comprising internal storage means for storing application software,
   wherein said control means can execute each of various processes by using application software recorded on the loaded recording medium and application software recorded in said internal storage means, and said control means forms record information about the application software used for some of the processes executed, and records the record information on the loaded recording medium with said drive means.

24. A computer apparatus according to claim 18, further comprising internal storage means for storing application software,
   wherein said control means can execute a process for at least one of forming a data file and editing a data file by using application software recorded on the loaded recording medium and application software recorded in said internal storage means, and said control means forms record information about the formed or edited file, and records the record information on the loaded recording medium with said drive means.

25. A computer apparatus according to claim 18, further comprising internal memory,
wherein said control means can download information stored in said internal memory to the loaded recording medium, and said control means forms record information about the downloading, and records the record information on the loaded recording medium with said drive means.

26. A computer apparatus according to claim 19, wherein said server system comprises a contents server which can communicate with the computer apparatus and which provides contents of media, and
wherein said control means can receive, with said communication means, information as a content of a medium provided from said contents server and can download the received content to the loaded recording medium with said drive means, and said control means forms record information about the downloading and records the record information with said drive means.

27. A computer apparatus according to claim 19, wherein said server system comprises an application server which can communicate with the computer apparatus and which provides application software, and
wherein said control means can receive, with said communication means, application software provided from said contents server and can download the received application software to the loaded recording medium with said drive means, and said control means forms record information about the downloading and records the record information with said drive means.

28. A computer system according to claim 18, wherein said control means forms record information as time information about use of the computer apparatus or some of various processes, and records the record information on the loaded recording medium with said drive means.

29. A computer system according to claim 26, wherein said control means forms record information about a fee charged for downloading of the content.

30. A computer system according to claim 27, wherein said control means forms record information about a fee charged for downloading of the application software.

31. A computer apparatus comprising:
recording medium drive means for reading information from a detachable recording medium and for writing information to the detachable recording medium;
condition confirmation means for performing conditional use confirmation processing for use of the terminal using information recorded on the recording medium when the recording medium is loaded to said drive means;
fee collection means for performing fee collection processing; and
control means for enabling use of the computer apparatus according to a result of the confirmation processing performed by said condition confirmation means, and for collecting a fee according to conditions of use of the computer apparatus with said fee collection means.

32. A computer apparatus according to claim 31, wherein said use condition confirmation means performs, as the use condition confirmation processing, ascertainment as to whether discrimination code information for enabling the loaded recording medium to be recognized as a recording medium corresponding to the computer apparatus is recorded on the loaded recording medium.

33. A computer apparatus according to claim 31, wherein said use condition confirmation means performs, as the use condition confirmation processing, the process of asking a user to input personal identification number information coinciding with personal identification number information recorded on the loaded recording medium, and performing collation between personal identification number information input by the user and the personal identification number information on the loaded recording medium.

34. A computer apparatus according to claim 31, wherein said use condition confirmation means performs, as the use condition confirmation processing, collation processing using serial number information recorded on the loaded recording medium.

35. A computer apparatus comprising:
recording medium drive means for reading information from a detachable recording medium and for writing information to the detachable recording medium;
condition confirmation means for performing conditional use confirmation processing for using the terminal using information recorded on the recording medium when the recording medium is loaded to said drive means;
fee collection means for performing fee collection processing;
communication means for performing communication with an external server system; and
control means for enabling use of the computer apparatus according to a result of the confirmation processing performed by said condition confirmation means, and for collecting a fee according to conditions of use of the computer apparatus with said fee collection means.

36. A computer apparatus according to claim 35, wherein said control means can make said communication means execute communication of information necessary for at least one of the use condition confirmation processing and various processes executed as use of the computer apparatus.

37. A computer apparatus according to claim 35, wherein said fee collection means collects a fee paid in currency or with a currency substitute card.

38. A computer apparatus according to claim 35, wherein said use condition confirmation means transmits information about fee charging to said server system through said communication means.

39. A computer apparatus according to claim 35, wherein said use condition confirmation means performs, as the use condition confirmation processing, ascertainment as to whether discrimination code information for enabling the loaded recording medium to be recognized as a recording medium corresponding to the computer apparatus is recorded on the loaded recording medium.

40. A computer apparatus according to claim 35, wherein said use condition confirmation means performs, as the use condition confirmation processing, the process of asking a user to input personal identification number information coinciding with personal identification number information recorded on the loaded recording medium, and performing collation between personal identification number information input by the user and the personal identification number information on the loaded recording medium.

41. A computer apparatus according to claim 35, wherein said use condition confirmation means performs, as the use condition confirmation processing, collation processing using serial number information recorded on the loaded recording medium.

42. A computer apparatus according to claim 35, wherein said use condition confirmation means performs, as the use condition confirmation processing, communication with said server system of information necessary for collation through said communication means, and performs use condition confirmation according to a result of collation of the communicated information.

43. A computer apparatus according to claim 35, wherein said server system comprises a contents server which can communicate with the computer apparatus and which provides contents of media, and wherein said control means can receive, with said communication means, information as a content of a medium provided from said contents server and can download the received content to the loaded recording medium with said drive means, and said control means makes said fee collection means collect a fee charged for downloading of the content.

44. A computer apparatus according to claim 35, wherein said server system comprises an application server which can communicate with the computer apparatus and which provides application software, and wherein said control means can receive, with said communication means, application software provided from said contents server and can download the received application software to the loaded recording medium with said drive means, and said control means makes said fee collection means collect a fee charged for downloading of the application software.

* * * * *